(12) United States Patent
Wang et al.

(10) Patent No.: US 11,710,845 B2
(45) Date of Patent: Jul. 25, 2023

(54) SYSTEMS, DEVICES, AND METHODS EMPLOYING ELECTROCHEMICAL PROCESSING WITH OXYGEN AS CARRIER GAS

(71) Applicant: University of Maryland, College Park, College Park, MD (US)

(72) Inventors: Chunsheng Wang, Silver Spring, MD (US); Ye Tao, Rockville, MD (US); K. Reinhard Radermacher, Silver Spring, MD (US); Yunho Hwang, Ellicott City, MD (US); Joseph Patrick Baker, Potomac, MD (US); Zhenyuan Mei, Greenbelt, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 779 days.

(21) Appl. No.: 16/202,019

(22) Filed: Nov. 27, 2018

(65) Prior Publication Data

US 2019/0165405 A1     May 30, 2019

Related U.S. Application Data

(60) Provisional application No. 62/590,922, filed on Nov. 27, 2017.

(51) Int. Cl.
*H01M 8/2483* (2016.01)
*H01M 8/0271* (2016.01)
(Continued)

(52) U.S. Cl.
CPC ....... *H01M 8/2483* (2016.02); *H01M 8/0263* (2013.01); *H01M 8/0265* (2013.01);
(Continued)

(58) Field of Classification Search
CPC .......... B01D 53/326; C01B 2210/0051; C01B 2210/0062
See application file for complete search history.

(56) References Cited

U.S. PATENT DOCUMENTS 5,041,195 A * 8/1991 Taylor ................... C25B 11/031
429/534
5,645,700 A * 7/1997 White ....................... C25B 9/19
204/266

(Continued)

FOREIGN PATENT DOCUMENTS

WO  WO-2013050146 A1 * 4/2013  ............ F24F 3/1411
WO  WO 2017/091785 A1    6/2017
(Continued)

OTHER PUBLICATIONS

English translation of Taku et al, JP 2010/ (Year: 2010).*
(Continued)

*Primary Examiner* — Salil Jain
(74) *Attorney, Agent, or Firm* — RowanTree Law Group, PLLC; Frederick F. Rosenberger

(57) ABSTRACT

An electrochemical module (EM) transfers a fluid across a membrane thereof using oxygen as a carrier gas. The EM has an anion exchange membrane (AEM) disposed between a first and second electrodes, each of which includes a catalyst. At an inlet side, the catalyst facilitates reaction of the fluid with carrier gas, such that an anion is formed. The anion is transported across the AEM in the presence of an electric field applied to the electrodes. At an outlet side, the catalyst facilitates dissociation of the anion back to the fluid and carrier gas. In some embodiments, the fluid comprises carbon dioxide, and the transporting by the EM is part of a heating/cooling cycle or a power generation cycle, or is used to capture carbon dioxide for storage or regeneration of stale (Continued)

air. In some embodiments, the fluid comprises water vapor, and the transporting by the EM dehumidifies air.

19 Claims, 18 Drawing Sheets

(51) Int. Cl.
| | |
|---|---|
| H01M 8/0263 | (2016.01) |
| H01M 8/0267 | (2016.01) |
| H01M 8/0265 | (2016.01) |
| H01M 8/241 | (2016.01) |
| H01M 8/04119 | (2016.01) |
| H01M 8/04014 | (2016.01) |
| H01M 8/0438 | (2016.01) |
| H01M 8/14 | (2006.01) |

(52) U.S. Cl.
CPC ....... *H01M 8/0267* (2013.01); *H01M 8/0271* (2013.01); *H01M 8/04022* (2013.01); *H01M 8/04164* (2013.01); *H01M 8/04432* (2013.01); *H01M 8/241* (2013.01); *H01M 2008/147* (2013.01)

(56) References Cited

U.S. PATENT DOCUMENTS

| | | | |
|---|---|---|---|
| 6,387,230 | B1 | 5/2002 | Murphy et al. |
| 7,846,604 | B2 | 12/2010 | Highgate et al. |
| 8,246,723 | B2 | 8/2012 | Wright et al. |
| 8,584,479 | B2 | 11/2013 | Kuwabara et al. |
| 8,627,671 | B2 | 1/2014 | Bahar |
| 8,640,492 | B2 | 2/2014 | Bahar |
| 8,769,972 | B2 | 7/2014 | Bahar |
| 9,005,411 | B2 | 4/2015 | Bahar et al. |
| 9,151,283 | B2 | 10/2015 | Bahar et al. |
| 9,457,324 | B2 | 10/2016 | Bahar et al. |
| 9,599,364 | B2 | 3/2017 | Bahar et al. |
| 9,738,981 | B2 | 8/2017 | Naugler et al. |
| 10,087,532 | B2 | 10/2018 | Bahar et al. |
| 10,890,344 | B2 | 1/2021 | Bahar et al. |
| 11,131,029 | B2 | 9/2021 | Wang et al. |
| 2002/0166763 | A1* | 11/2002 | Tsai ................. B01D 67/0044 204/252 |
| 2004/0211679 | A1 | 10/2004 | Wong et al. |
| 2009/0293526 | A1* | 12/2009 | Ichinomiya ............ F24F 3/1411 62/271 |
| 2011/0133308 | A1 | 6/2011 | Chan et al. |
| 2011/0207028 | A1* | 8/2011 | Fukuta ................ H01M 8/103 429/535 |
| 2015/0241091 | A1 | 8/2015 | Bahar |
| 2016/0341449 | A1 | 11/2016 | Bahar |
| 2017/0362720 | A1 | 12/2017 | Bahar et al. |
| 2018/0058729 | A1* | 3/2018 | Bahar ................. B01D 69/02 |
| 2019/0161870 | A1 | 5/2019 | Wang et al. |

FOREIGN PATENT DOCUMENTS

| | | | |
|---|---|---|---|
| WO | WO-2018147253 A1 * | 8/2018 | ............. F25D 11/00 |
| WO | WO 2018/161711 A1 | 9/2018 | |

OTHER PUBLICATIONS

Adams et al., "A Carbon Dioxide Tolerant Aqueous-Electrolyte-Free Anion-Exchange Membrane Alkaline Fuel Cell," *ChemSusChem*, Dec. 2007, 1: pp. 79-81. (3 pages).
Bedbak et al., "Performance analysis of a compressor driven metal hydride cooling system," *International Journal of Hydrogen Energy*, Dec. 2004, 30: pp. 1127-1137. (11 pages).
Bullecks et al., "Development of a cylindrical PEM fuel cell," *International Journal of Hydrogen Energy*, Nov. 2010, 36: pp. 713-719. (7 pages).
Bussayajarn et al., "Planar air breathing PEMFC with self-humidifying MEA and open cathode geometry design for portable applications," *SIMTech technical reports*, 2010, 11(2): pp. 66-69. (4 pages).
Chen et al., "Hydroxide Solvation and Transport in Anion Exchange Membranes," *Journal of the American Chemical Society*, Dec. 2015, 138: pp. 991-1000. (10 pages).
Chu et al., "Performance of polymer electrolyte membrane fuel cell (PEMFC) stacks. Part I. Evaluation and simulation of an air-breathing PEMFC stack," *Journal of Power Sources*, 1999, 83: pp. 128-133. (6 pages).
Dais Analytic Corporation, "Membrane dehumidification enabling alternative cooling strategies in humid environments," Presentation at ARPA-E Summit [online], Feb. 2013 [retrieved on Nov. 14, 2022]. Retrieved from the Internet: <URL: http://www.arpae-summit.com/paperclip/exhibitor_docs/13AE/Dais_Analytic_Corporation_104.pdf>. (11 pages).
Dekel, Dario R. "Review of cell performance in anion exchange membrane fuel cells," *Journal of Power Sources*, Aug. 2017, 375: pp. 158-169. (12 pages).
Fabian et al., "The role of ambient conditions on the performance of a planar, air-breathing hydrogen PEM fuel cell," *Journal of Power Sources*, May 2006, 161: pp. 168-182. (15 pages).
Faghri et al., "Challenges and opportunities of thermal management issues related to fuel cell technology and modeling," *International Journal of Heat and Mass Transfer*, 2005, 48: pp. 3891-3920. (30 pages).
Ganley, Jason C., "An intermediate-temperature direct ammonia fuel cell with a molten alkaline hydroxide electrolyte," *Journal of Power Sources*, Dec. 2007, 178: pp. 44-47. (4 pages).
Gardner et al., "Electrochemical separation of hydrogen from reformate using PEM fuel cell technology," *Journal of Power Sources*, Jun. 2007, 171: pp. 835-841. (7 pages).
Gerlach, David W., "Experimental Verification of Electroosmotic Dehumidification with Nafion and Plaster-Silica Gel Membranes," *International Refrigeration and Air Conditioning Conference*, Jul. 2008, Paper No. 862 (2436). (9 pages).
Grigoriev et al., "Description and characterization of an electrochemical hydrogen compressor/concentrator based on solid polymer electrolyte technology," *International Journal of Hydrogen Energy*, Aug. 2010, 36: pp. 4148-4155. (8 pages).
Halseid et al., "Effect of ammonia on the performance of polymer electrolyte membrane fuel cells," *Journal of Power Sources*, Dec. 2005, 154: pp. 343-350. (8 pages).
Hopkins et al., "Hydrogen compression characteristics of a dual stage thermal compressor system utilizing $LaNi_5$ and $Ca_{0.6}Mm_{0.4}Ni_5$ as the working metal hydrides," *International Journal of Hydrogen Energy*, Apr. 2010, 35: pp. 5693-5702. (10 pages).
Iwahara et al., "Electrochemical dehumidification using proton conducting ceramics," *Solid State Ionics*, 2000, 136-137: pp. 133-138. (6 pages).
Jeong et al., "Effects of cathode open area and relative humidity on the performance of air-breathing polymer electrolyte membrane fuel cells," *Journal of Power Sources*, Nov. 2005, 158: pp. 348-353. (6 pages).
Joo et al., "Size Effect of Ruthenium Nanoparticles in Catalytic Carbon Monoxide Oxidation," *Nano Letters*, Jun. 2010, 10: pp. 2709-2713. (5 pages).
Jung et al., "An experimental approach to investigate the transport of ammonia as a fuel contaminant in proton exchange membrane fuel cells," *Journal of Power Sources*, Nov. 2014, 275: pp. 14-21. (8 pages).
Kamkari et al., "Investigation of Electrohydrodynamically-Enhanced Convective Heat and Mass Transfer from Water Surface," *Heat Transfer Engineering*, 2010, 31(2): pp. 138-146. (9 pages).
Kim et al., "Air-breathing miniature planar stack using the flexible printed circuit board as a current collector," *International Journal of Hydrogen Energy*, Nov. 2008, 34: pp. 459-466. (8 pages).
Lai et al., "EHD-enhanced drying with multiple needle electrode," *Journal of Electrostatics*, Dec. 2004, 63: pp. 223-237. (15 pages).
Li et al., "The performance of PEM fuel cells fed with oxygen through the free-convection mode," *Journal of Power Sources*, 2003, 114: pp. 63-69. (7 pages).

(56) References Cited

OTHER PUBLICATIONS

Luo et al., "An Acrylate-Polymer-Based Electrolyte Membrane for Alkaline Fuel Cell Applications," *ChemSumChem*, 2011, 4: pp. 1557-1560. (4 pages).
Matian et al., "Model based design and test of cooling plates for an air-cooled polymer electrolyte fuel cell stack," *International Journal of Hydrogen Energy*, Mar. 2011, 36: pp. 6051-6066. (16 pages).
Mefford et al., "Anion charge storage through oxygen intercalation in $LaMnO_3$ perovskite pseudocapacitor electrodes," *Nature Materials*, Jul. 2014, 13: pp. 726-732. (7 pages).
Mehta et al., "Review and analysis of PEM fuel cell design and manufacturing," *Journal of Power Sources*, 2003, 114: pp. 32-53. (22 pages).
Misran et al., "Water transport characteristics of a PEM fuel cell at various operating pressures and temperatures," *International Journal of Hydrogen Energy*, Jan. 2013, 38: pp. 9401-9408. (8 pages).
Moton et al., "Advances in Electrochemical Compression of Hydrogen," *Proceedings of the ASME 2014 12th International Conference on Fuel Cell Science, Engineering and Technology*, Jun. 30-Jul. 2, 2014. (10 pages).
Muthukumar et al., "Metal hydride based heating and cooling systems: A review," *International Journal of Hydrogen Energy*, Feb. 2010, 35: pp. 3817-3831. (15 pages).
Odabaee et al., "Metal foam heat exchangers for thermal management of fuel cell systems—An experimental study," *Experimental Thermal and Fluid Science*, Aug. 2013, 51: pp. 214-219. (6 pages).
Ohadi et al., "Heat transfer enhancement of laminar and turbulent pipe flow via corona discharge," *Int. J. Heat Mass Transfer*, 1991, 34(4/5): pp. 1175-1187. (13 pages).
Onda et al., "Separation and compression characteristics of hydrogen by use of proton exchange membrane," *Journal of Power Sources*, Nov. 2006, 164: pp. 1-8. (8 pages).
Pandey et al., "Insight on pure vs air exposed hydroxide ion conductivity in an anion exchange membrane for fuel cell applications," *ECS Transactions*, 2014, 64(3): pp. 1195-1200. (6 pages).
Pennline et al., "Separation of $CO_2$ from flue gas using electrochemical cells," *Fuel*, Dec. 2009, 89: pp. 1307-1314. (8 pages).
Qi et al., "Performance investigation on polymeric electrolyte membrane-based electrochemical air dehumidification system," *Applied Energy*, Sep. 2017, 208: pp. 1174-1183. (10 pages).
Rigdon et al., "Reaction Dependent Transport of Carbonate and Bicarbonate through Anion Exchange Membranes in Electrolysis and Fuel Cell Operations," *ECS Transactions*, 2015, 69(33): pp. 1-9. (9 pages).
Sakuma et al., "Estimation of dehumidifying performance of solid polymer electrolytic dehumidifier for practical application," *J Appl Electrochem*, Sep. 2010, 40: pp. 2153-2160. (8 pages).
Sakuma et al., "Water transfer simulation of an electrolytic dehumidifier," *J Appl Electrochem*, Nov. 2008, 39: pp. 815-825. (11 pages).
Shafiee et al., "Different reactor and heat exchanger configurations for metal hydride hydrogen storage systems—A review," *International Journal of Hydrogen Energy*, May 2016, 41: pp. 9462-9470. (9 pages).
Shaughnessy et al., "Electrohydrodynamic Pressure of the Point-to-Plane Corona Discharge," *Aerosol Science and Technology*, 1991, 14: pp. 193-200. (8 pages).
Soto et al., "Effect of Transient Ammonia Concentrations on PEMFC Performance," *Electrochemical and Solid-State Letters*, Apr. 2003, 6(7): pp. A133-A135. (3 pages).
Strobel et al., "The compression of hydrogen in an electrochemical cell based on a PE fuel cell design," *Journal of Power Sources*, 2002, 105: pp. 208-215. (8 pages).
Tao et al., "Electrochemical ammonia compression," *Chem. Commun.*, 2017, 53: pp. 5637-5640. (4 pages).
Tao et al., "Electrochemical compressor driven metal hydride heat pump," *International Journal of Refrigeration*, Aug. 2015, 60: pp. 278-288. (11 pages).
Tao et al., "Performance Investigation on Electrochemical Compressor with Ammonia," *23rd International Compressor Engineering Conference at Purdue*, Jul. 2016, Paper No. 2469(1380). (6 pages).
Unlu et al., "Anion Exchange Membrane Fuel Cells: Experimental Comparison of Hydroxide and Carbonate Conductive Ions," *Electrochemical and Solid-State Letters*, Jan. 2009, 12(3): pp. B27-B30. (4 pages).
Uribe et al., "Effect of Ammonia as Potential Fuel Impurity on Proton Exchange Membrane Fuel Cell Performance," *Journal of the Electrochemical Society*, Jan. 2002, 149(3): pp. A293-A296. (4 pages).
Varcoe et al., "Anion-exchange membranes in electrochemical energy systems," *Energy & Environmental Science*, 2014, 7: pp. 3135-3191. (57 pages).
Vega et al., "Carbonate Selective $Ca_2Ru_2O_{7-y}$ Pyrochlore Enabling Room Temperature Carbonate Fuel Cells, I. Synthesis and Physical Characterization" *Journal of the Electrochemical Society*, Dec. 2011, 159(1): pp. B12-B17. (6 pages).
Vega et al. "Carbonate Selective $Ca_2Ru_2O_{7-y}$ Pyrochlore Enabling Room Temperature Carbonate Fuel Cells, II. Verification of Carbonate Cycle and Electrochemical Performance," *Journal of the Electrochemical Society*, 2012, 159(1): pp. B18-B23. (6 pages).
Wang et al., "Investigation of potential benefits of compressor cooling," *Applied Thermal Engineering*, Nov. 2007, 28: pp. 1791-1797. (7 pages).
Weng et al., "Electrochemical $CO_2$ Reduction to Hydrocarbons on a Heterogeneous Molecular Cu Catalyst in Aqueous Solution," *Journal of the American Chemical Society*, Jun. 2016, 138: pp. 8076-8079. (4 pages).
Zhang et al., "A critical review of cooling techniques in proton exchange membrane fuel cell stacks," *International Journal of Hydrogen Energy*, Nov. 2011, 37: pp. 2412-2429. (18 pages).
Zhou et al., "Anionic polysulfone ionomers and membranes containing fluorenyl groups for anionic fuel cells," *Journal of Power Sources*, Jan. 2009, 190: pp. 285-292. (8 pages).

\* cited by examiner

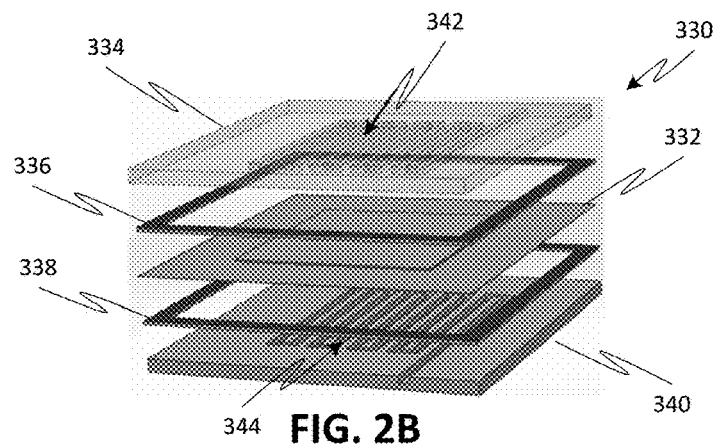
FIG. 2B
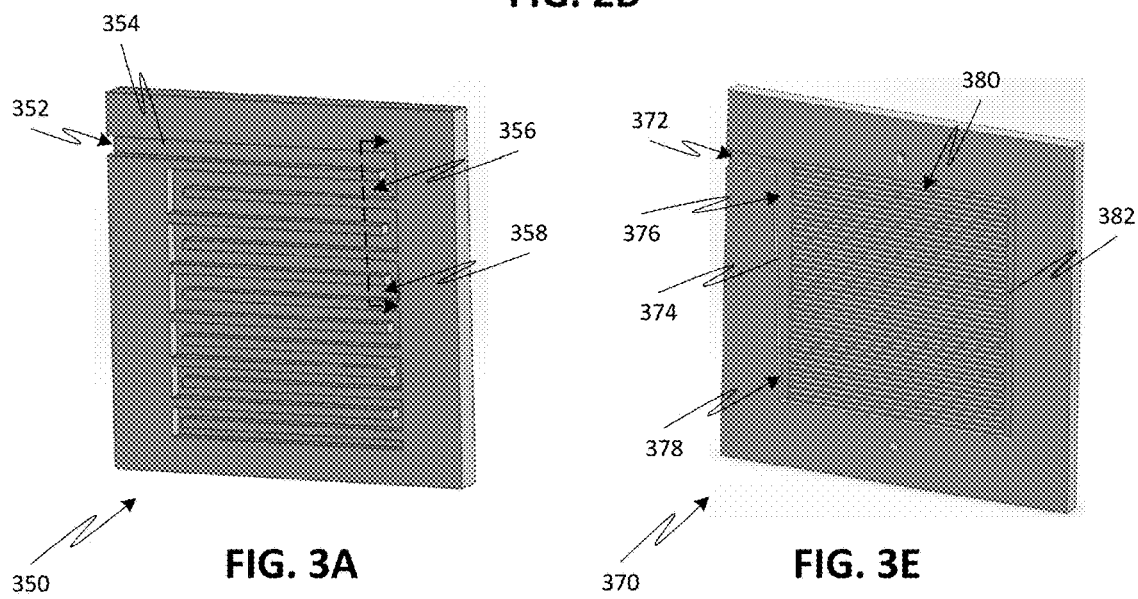
FIG. 3A
FIG. 3E
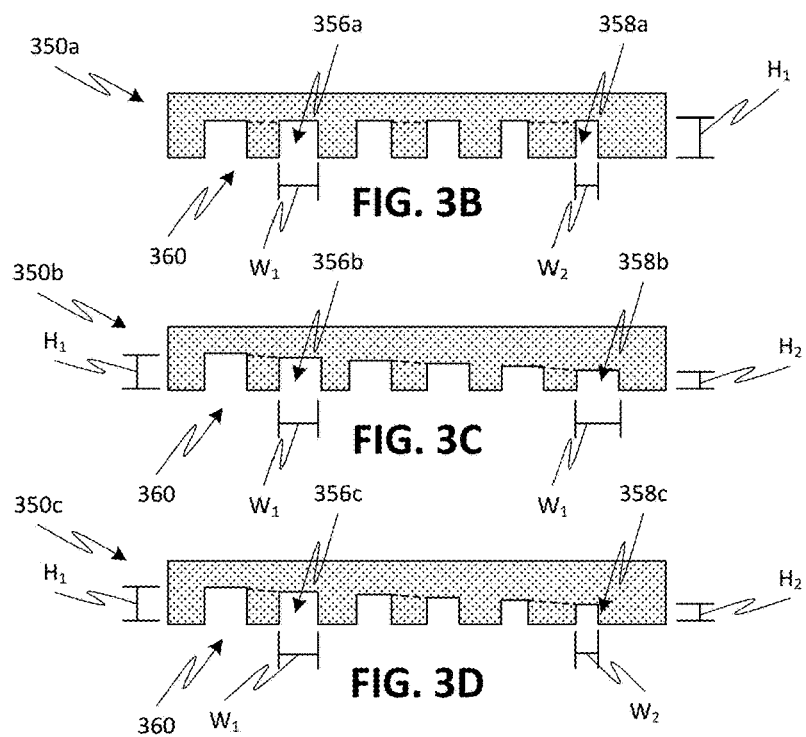
FIG. 3B
FIG. 3C
FIG. 3D

SYSTEMS, DEVICES, AND METHODS EMPLOYING ELECTROCHEMICAL PROCESSING WITH OXYGEN AS CARRIER GAS

CROSS-REFERENCE TO RELATED APPLICATIONS

The present application claims the benefit of U.S. Provisional Application No. 62/590,922, filed Nov. 27, 2017, which is hereby incorporated by reference herein in its entirety.

FIELD

The present disclosure relates generally to thermodynamic processing, and more particularly, to systems, devices, and methods employing electrochemical processing (e.g., pumping, transport, compression, or expansion) with oxygen as carrier gas.

SUMMARY

Embodiments of the disclosed subject matter convey a fluid, such as but not limited to carbon dioxide ($CO_2$) or water vapor ($H_2O$), across a membrane of an electrochemical module using oxygen ($O_2$) as a carrier gas. The electrochemical module combines the fluid with $O_2$ and electrons (e) to form an anion of the fluid and transports the anions through an anion exchange membrane. The anion exchange membrane is disposed between opposing electrodes, which may include respective catalysts that facilitate the reaction of the fluid with the oxygen carrier gas. The electrochemical module employing $O_2$ as the carrier gas can be used in a variety of applications, including, but not limited to, compressing or expanding fluid in a heating/cooling system (e.g., vapor compression cycle) or power generation system (e.g., organic Rankine cycle or Brayton cycle), or removing the fluid from an air flow or flue gas flow (e.g., for $CO_2$ capture, regeneration of stale air, or dehumidification).

In one or more embodiments, a system comprises an electrochemical module. The electrochemical module comprises an anion exchange membrane, a first electrode, and a second electrode. The first electrode is on an inlet side of the anion exchange membrane, and the second electrode is on an outlet side of the anion exchange membrane. The outlet side is opposite the inlet side. The electrochemical module is constructed to transport a fluid from the inlet side to the outlet side of the anion exchange membrane, in the presence of an electric field applied between the first and second electrodes, via a combination of the fluid with a carrier gas. The carrier gas comprises $O_2$.

In one or more embodiments, a method comprises applying an electric field between first and second electrodes. The first electrode is on an inlet side of an anion exchange membrane of an electrochemical module. The second electrode is on an outlet side of the anion exchange membrane. The outlet side is opposite the inlet side. The method further comprises, at the inlet side of the anion exchange membrane, combining a fluid and a carrier gas. The method also comprises, in the presence of the applied electric field, transporting the combined fluid and carrier gas through the anion exchange membrane to the outlet side, and, at the outlet side of the anion exchange membrane, dissociating the transported combination back to the fluid and carrier gas. The carrier gas comprises $O_2$.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

FIG. 2B is an exploded perspective view of an electrochemical device, according to one or more embodiments of the disclosed subject matter.

FIG. 3A is a perspective view of an outlet face of an exemplary gas inlet manifold of an electrochemical device, according to one or more embodiments of the disclosed subject matter.

FIG. 3B is a cross-sectional view of an inlet flow channel of the gas inlet manifold having a first exemplary geometry, according to one or more embodiments of the disclosed subject matter.

FIG. 3C is a cross-sectional view of an inlet flow channel of the gas inlet manifold having a second exemplary geometry, according to one or more embodiments of the disclosed subject matter.

FIG. 3D is a cross-sectional view of an inlet flow channel of the gas inlet manifold having a third exemplary geometry, according to one or more embodiments of the disclosed subject matter.

FIG. 3E is a perspective view of an inlet face of an exemplary gas outlet manifold of an electrochemical device, according to one or more embodiments of the disclosed subject matter.

DETAILED DESCRIPTION

Embodiments of the disclosed subject matter relate to electrochemical transport of a fluid across a membrane by using oxygen ($O_2$) as a carrier gas. For example, the fluid can comprise carbon dioxide ($CO_2$), water vapor ($H_2O$), or any other compound capable of combining with $O_2$ and electrons to form an anion. Using a combination of the $O_2$ with the fluid, an electric field applied across the membrane transports the combination through the membrane, which transport may be used to accomplish one or more pressure processes (i.e., compression or expansion) of a heating/cooling system (e.g., a vapor compression cycle) or power generation system (e.g., an organic Rankine cycle or Brayton cycle), to isolate a particular component in an inlet gas flow (i.e., reducing $CO_2$ content in an exhaust gas or stale air, or reducing water vapor in conditioned air), or for any other purpose. In some embodiments, the transport of the combination through the membrane may generate an electric field.

Figure 1A:
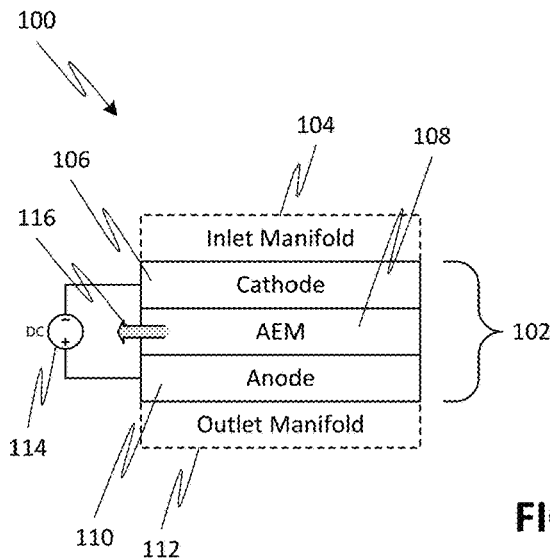
FIG. 1A is a simplified schematic diagram illustrating aspects of electrochemical compression using oxygen ($O_2$) as carrier gas, according to one or more embodiments of the disclosed subject matter.
Figure 1A:
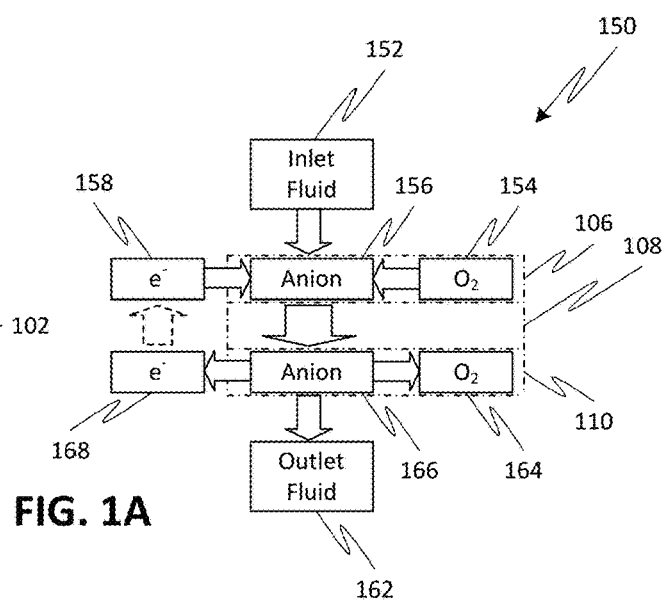

FIG. 1A illustrates aspects of an electrochemical module 100 transporting a fluid using $O_2$ as a carrier gas. The electrochemical module 100 includes an anion exchange membrane (AEM) 108 disposed between a pair of gas-permeable electrodes 106, 110. The AEM 108 can include a membrane electrolyte, for example, an ionomer, such as a polymer electrolyte or a conductive carbonate ion solid electrolyte. The electrodes 106, 110 are formed of or coated with an appropriate catalyst that facilitates reactions of the fluid and/or the $O_2$ carrier gas. For example, the electrodes 106, 110 can be formed of or coated with a catalyst of platinum (Pt), CaRuO₃, or any other material depending on the fluid to be transported. The catalyst material of the cathode electrode 106 can be the same as or different from the catalyst material of the anode electrode 110.

For example, in a fabricated embodiment, the electrodes were formed of CaRuO₃ and attached to opposing surfaces of the AEM. KMnO₄ was used as a strong oxidizing agent and mixed with 1M KOH solution to prepare 1 mM potassium permanganate solution. CaO and RuCl₃ were mixed in a 1:1 molar ratio and dissolved in the potassium permanganate solution. The solution was placed in a stainless-steel reaction vessel and heated to 200° C. for 48 hours. The resulting precipitated product was washed with de-ionized (DI) water and ethanol and dried overnight at 80° C. The AEM was pre-treated by ion exchanging from Cl⁻ state to $CO_3^{2-}$ state by soaking in Na₂CO₃ solution for 24 hours. An ink of the catalyst was prepared by mixing CaRuO₃ with 5% ionomer solution in isopropanol, which solution was then sonicated for 30 mins to form an ink suspension. The ink solution in suspension form was brushed on the surface of carbon cloth, with loading amount of 5 mg/cm², in order to form anode and cathode electrodes. The prepared electrodes were then pressed against the AEM with pound force of 500 psi to couple the electrodes to the AEM. Other fabrication processes for forming the electrodes and/or AEM are also possible according to one or more contemplated embodiments.

The assembly of the electrodes 106, 110 to AEM 108 can be considered an integral membrane electrode assembly (MEA) 102 and can be separately coupled to gas inlet distribution manifold 104 (i.e., suction-side or feed-side volume) and gas outlet distribution manifold 112 (i.e., discharge-side volume) to convey fluid and/or O₂ carrier gas to/from the AEM 108. In some embodiments, the MEA 102 can include additional support structures, such as stainless-steel mesh, between the electrodes and the adjacent manifold, to bolster the AEM 108 against high pressures generated at the discharge side by the transport of the fluid through the AEM 108. DC voltage source 114, connected to the electrodes 106, 110, can apply an electric field to the AEM 108 to drive transport of the fluid, in particular, the ionic form of the fluid, therethrough.

Figure 7A:
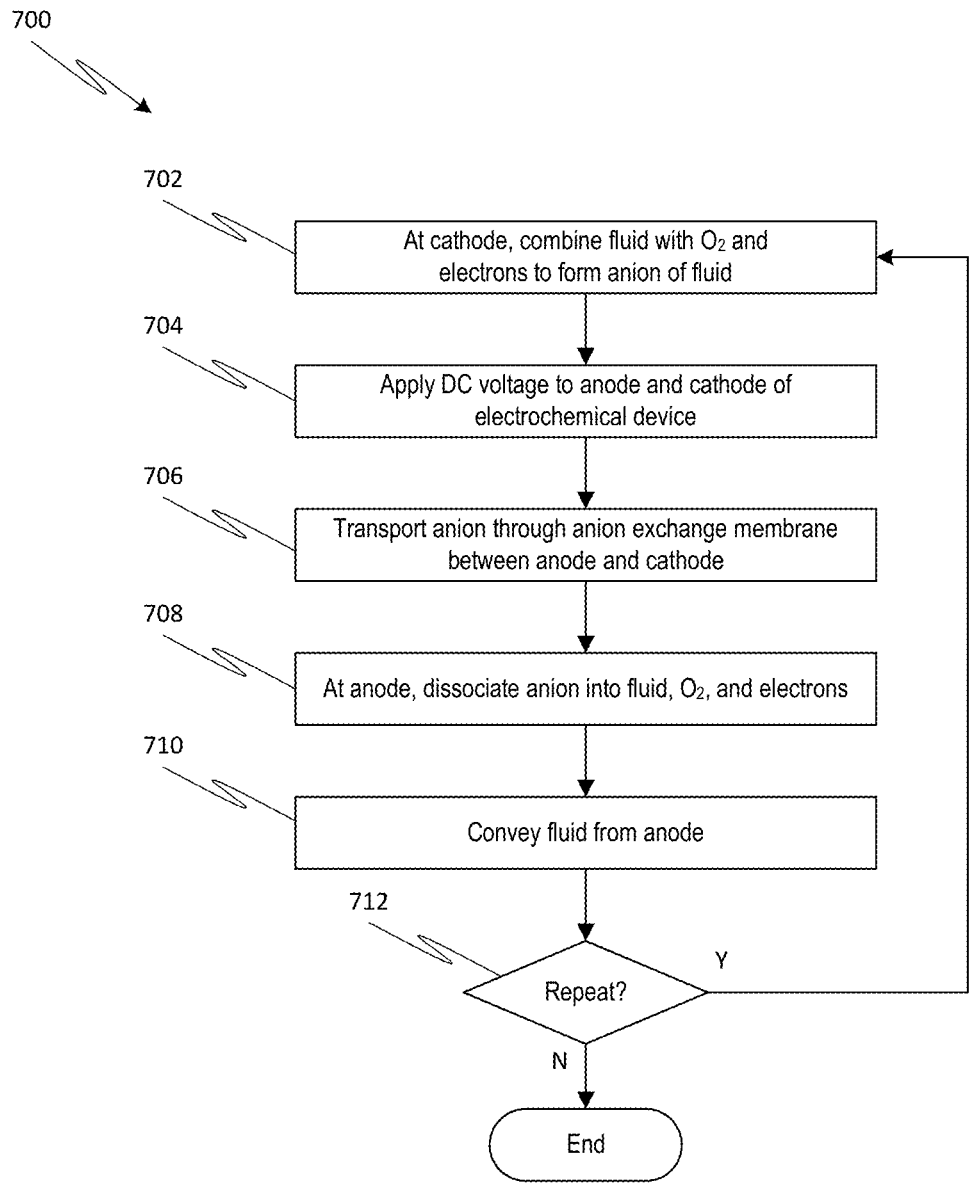
FIG. 7A is an exemplary process flow diagram for electrochemical compression using oxygen as carrier gas, according to one or more embodiments of the disclosed subject matter.

Referring to FIG. 7A and the generalized electrochemistry 150 illustrated at right in FIG. 1A, the electrochemical transport process 700 using module 100 includes, at 702, combining fluid 152 at a relatively low pressure with oxygen carrier gas 154 (i.e., O₂) and electrons 158 to form an anion 156 of the fluid. In some embodiments, the low-pressure fluid 152 can be provided to the inlet manifold 104 of electrochemical module 100 from part of a heating/cooling or power generation cycle, e.g., an evaporating heat exchanger of a vapor compression cycle. In other embodiments, the low-pressure fluid 152 can a constituent part of a gas or air flow provided to the inlet manifold 104 of electrochemical module 100 for processing, for example, to remove CO₂ or H₂O from the gas or air flow.

The O₂ carrier gas 154 can be part of the cathode 106 (e.g., absorbed within a material of the electrode, as explained in further detail below) or externally supplied to the cathode 106, for example, separate from the fluid (e.g., via a separate inlet to the inlet manifold 104) or as part of the fluid supplied to the inlet manifold (e.g., where the gas or air flow includes CO₂ or H₂O as well as O₂).

At the cathode 106, interaction with the catalyst causes a reaction between the fluid, 152, O₂ carrier gas 154, and electrons 158 (e.g., from voltage source 114) to form the fluid anion 156. For example, when the fluid is CO₂ and the catalyst is Pt, the catalyst-facilitated reactions at the cathode 106 to form the corresponding fluid anion, $HCO_3^-$, are given by:

$$4OH^- + 4CO_2 \rightarrow 4HCO_3^- \quad (1)$$

In another example, when the fluid is CO₂ and the catalyst is CaRuO₃, the catalyst-facilitated reaction at the cathode 106 to form the corresponding fluid anion, $CO_3^{2-}$, is given by:

$$2CO_2 + O_2 + 4e^- \rightarrow 2CO_3^{2-} \quad (2)$$

In another example, when the fluid is H₂O, the catalyst-facilitated reaction at the cathode 106 to form the corresponding fluid anion, OH⁻, is given by:

$$2H_2O + O_2 + 4e^- \rightarrow 4OH^- \quad (3)$$

The process 700 can proceed to 704, where voltage source 114 applies an electric field to the cathode 106 and anode 110 of the MEA 102, such that, at 706, the fluid anion 156 is transported from the cathode 106 side through AEM 108 to the anode 110 side. In the transport 706, the O₂ gas serves as a carrier for the fluid. The fluid in the ionic form (i.e., the anion 156) can move freely in the AEM 116 via an ion hopping mechanism. For example, the anion 156 can attach to carbonate functional groups in AEM 116 and can readily hop from one carbonate functional group to another carbonate functional group, driven by the DC voltage potential supplied by power supply 114.

At the anode 110, the catalyst facilitates dissociation of the transported fluid anion 166 at 708 to reform the constituent fluid and O₂ carrier gas. For example, when the fluid is CO₂ and the catalyst is Pt, the catalyst-facilitated reactions at the anode 110 are given by:

$$4OH^- \rightarrow O_2 + 2H_2O + 4e^- \quad (4)$$

In another example, when the fluid is CO₂ and the catalyst is CaRuO₃, the catalyst-facilitated reaction at the anode 110 is given by:

$$2CO_3^{2-} \rightarrow 2CO_2 + O_2 + 4e^- \quad (5)$$

In another example, when the fluid is H₂O, the catalyst-facilitated reaction at the anode 110 is given by:

$$4OH^- \rightarrow 2H_2O + O_2 + 4e^- \quad (6)$$

In essence, 708 is the reverse process of 702, with electrons 168 being released from the dissociating anion 166 to regenerate the O₂ gas 164 and the fluid 162.

If the fluid flow to the inlet manifold 104 and the fluid flow from the outlet manifold 112 are regulated (e.g., when electrochemical module 100 operates as a compressor), the resulting fluid 162 at the discharge-side can be at a higher pressure. The resulting fluid 162 in outlet manifold 112 can then be conveyed at 710 for further processing (e.g., chemical or electrochemical modification for storage), waste disposal (e.g., discharge to a volume external to a conditioned space) and/or use (e.g., as the input to a heat exchanger or as a source of water). At 712, it can be determined if the process 700 should be repeated, for example, as part of a heating/cooling or power generation cycle or any other cycle, in which case the process 700 returns to 702.

Although 702-712 are illustrated separately in FIG. 7A, it is contemplated that such process steps may occur contemporaneously, for example, during the continuous operation of a cycle. Moreover, the particular order of 702-712 in FIG.

7A has been chosen for explanatory purposes only and is not intended to be limiting. Indeed, in practical embodiments of the disclosed subject matter, the illustrated steps may occur before or during other steps. For example, the electric field application of 704 may occur before or during the forming the anion of 702.

As referenced above, in some embodiments, the $O_2$ carrier gas may be provided to the inlet manifold 104 separately from the fluid or as part of the fluid (i.e., an air mixture including $CO_2$ and $O_2$, or $H_2O$ and $O_2$). In other embodiments, the electrochemical module 100 can be constructed to restrict $O_2$ from circulating outside of the MEA 102. For example, the cathode 106 and the anode 110 can include an oxygen-absorbing material, such as $LaMnO_3$ perovskite. At the cathode 106, the oxygen-absorbing material can store $O_2$ therein and can release as $O_2$ gas 154 for combination with the fluid 152. Similarly, at the anode 110, the oxygen-absorbing material can receive $O_2$ gas 164 from the dissociation of anion 166 and store the $O_2$ therein. As a result, the $O_2$ gas only migrates within the MEA 102. Once the oxygen-absorbing electrodes have been expended (i.e., when the cathode 106 has released all of its stored $O_2$ or when the anode 110 has reached its capacity for storing $O_2$), the electrodes can be regenerated, such as by reversing the flow through the electrochemical module 100, for example, as described below with respect to FIGS. 6A-6G.

The electrochemical transport process 150 uses energy in the form of a voltage charge (and corresponding current) supplied by the power supply 114. As a result, the electrochemical module 100 may be heated, which in turn may increase a temperature of the fluid 162. This increased temperature of the discharged, compressed fluid 162 can be undesirable in some applications, for example, when the module 100 serves as compressor of a vapor compression cycle. Thus, in some embodiments, heat 116 may be removed by cooling the module 100 and/or the resulting fluid output. As compared to conventional mechanical compressors, the electrochemical compressor 110 has relatively large surface areas (e.g., of AEM 108) for passive cooling.

Alternatively or additionally, heat 116 can be removed from the MEA 102 and/or the discharge fluid 162 via active cooling to yield a substantially temperature-controlled compression process 150. In some embodiments, the active cooling can yield a temperature for the fluid discharge 162 that has been chosen to maximize system performance (or to at least improve performance of the system). For example, the discharge may have a temperature value slightly higher than that of a subsequent heat exchanger (e.g., condenser in a vapor compression system). For example, heat 116 can be removed by heat exchangers thermally coupled to the outlet manifold 112. Such a heat exchanger can be an open channel heat exchanger (e.g., where a cooling air is flowed through a channel in or adjacent to channels in the outlet manifold 112), a microchannel flat tube array thermally coupled to the outlet manifold 212 and/or the MEA 102 (e.g., which can use higher density fluid than air), a metal foam heat exchanger thermally coupled to the outlet manifold 212 and/or the MEA 102, or any other type of heat exchanger setup.

Figure 1B:
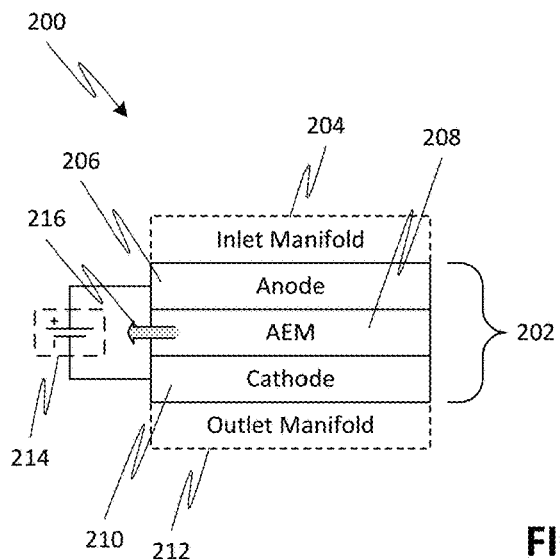
FIG. 1B is a simplified schematic diagram illustrating aspects of electrochemical expansion using oxygen as carrier gas, according to one or more embodiments of the disclosed subject matter.
Figure 1B:
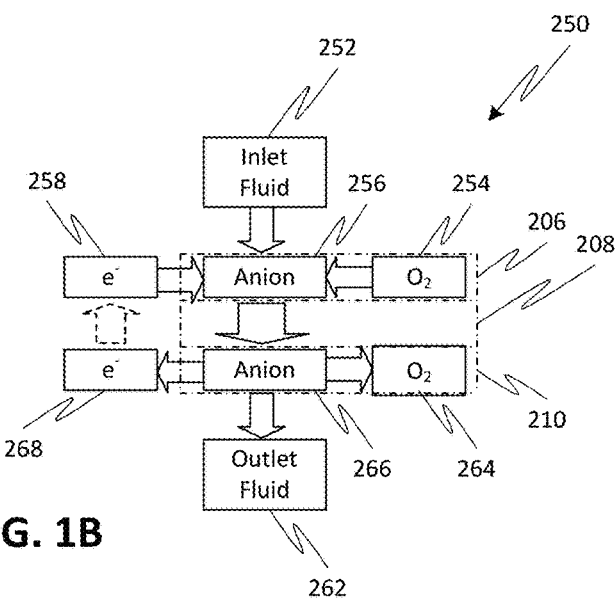

As noted above, the transport of the combination of $O_2$ and fluid through the membrane can be used to generate an electric field. For example, such transport may be driven by a pressure gradient between the inlet and outlet sides of the membrane. FIG. 1B illustrates aspects of another electrochemical module 200 that can be used to transport fluid therethrough using $O_2$ as carrier gas. As with the electrochemical module 100, the electrochemical module 200 has AEM 208 disposed between a pair of gas-permeable electrodes 206, 210 operating as anode and cathode, respectively. The assembly of the electrodes 206, 210 to AEM 208 can be considered an integral membrane electrode assembly (MEA) 202 and can be separately coupled to inlet gas distribution manifold 204 and outlet gas distribution manifold 212 to convey working fluid and/or carrier gas to/from AEM 208.

In effect, operation of electrochemical module 200 is the reverse process of the operation of electrochemical module 100 described above with respect to FIGS. 1A and 7A. However, in contrast to the electrochemical module 100 setup, the electrochemical module 200 has an opposite polarity (i.e., anode 206 on inlet side and cathode 210 on outlet side). An electric field can be generated between the electrodes 206, 210 by passing the ionic form of the fluid through the AEM 208, which electric field can be captured by the system for use in powering other components (e.g., for use by or to supplement power supply 114) or stored by an optional power storage device 214 (e.g., battery) for later use. Thus, electrochemical module 200 may be considered a power harvesting device. The transport may be such that a pressure of the fluid on an outlet side of the membrane 208 is lower than on an inlet side.

In some embodiments, the electrochemical module 200 may be the same device as electrochemical module 100 but operating in a reverse flow direction with opposite polarity. Thus, heat 216 can be removed in a manner similar to that described above for electrochemical module 100. Moreover, electrodes 206, 210 may be constructed to retain $O_2$ carrier gas within MEA 202 in a manner similar to that described above for electrochemical module 100.

Figure 7B:
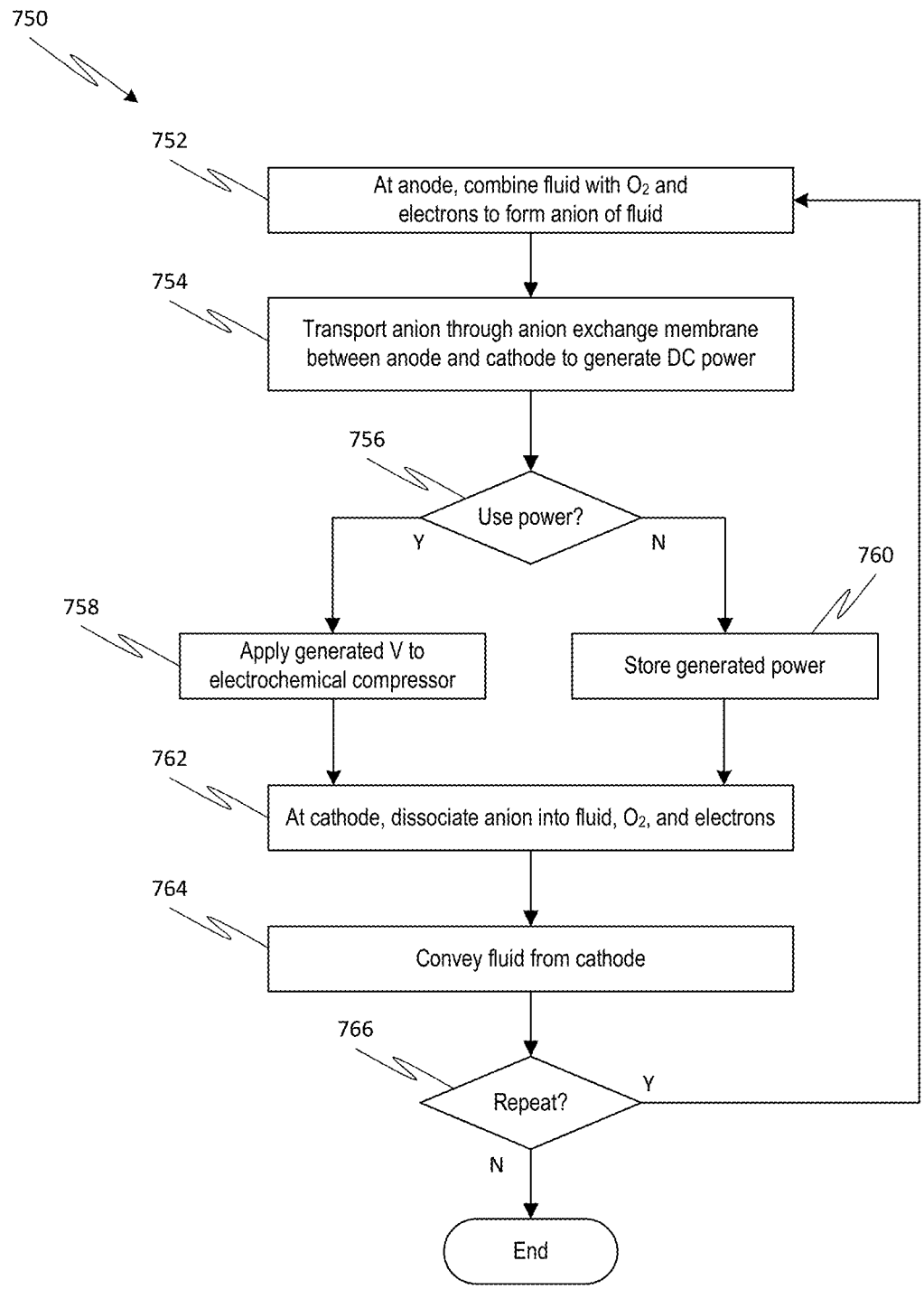
FIG. 7B is an exemplary process flow diagram for electrochemical expansion using oxygen as carrier gas, according to one or more embodiments of the disclosed subject matter.

Referring to FIG. 7B and the generalized electrochemistry 250 illustrated at right in FIG. 1B, the electrochemical process 750 using device 200 includes, at 752, combining fluid 252, which may be at a relatively high pressure, with electrons 258 and $O_2$ carrier gas 254 to form an anion 256 of the fluid. The fluid 252 can be provided to inlet manifold 204 of electrochemical module 200, for example, from another process of the heating/cooling or power generation cycle, e.g., a condensing heat exchanger. As with process 700, the $O_2$ carrier gas 254 can be part of the anode 206 (e.g., absorbed within a material of the electrode, as explained in further detail below) or externally supplied to the anode 206, for example, separate from the fluid (e.g., via a separate inlet to the inlet manifold 204) or as part of the fluid supplied to the inlet manifold (e.g., as a mixture of fluid and $O_2$).

At the anode 206, interaction with the catalyst facilitates a reaction between the electrons, fluid, and $O_2$ carrier gas to form the fluid anion 256. The process 750 can proceed to 754, where the anion 256 is transported from the anode 206 side through AEM 208 to the cathode 210 side, for example, by a pressure gradient across the AEM 208. The transport of fluid anion 256 can generate an electric field (i.e., DC power). At 756, it is determined whether the generated power is to be used at 758 (e.g., to power another component of the system, such as electrochemical module 100) or to be stored at 760 (e.g., by charging a battery). At the cathode 210, the catalyst facilitates dissociation of the transported fluid anion 266 at 762 to reform the constituent fluid, $O_2$ carrier gas, and electrons. In essence, 762 is the reverse process of 752, with electrons 668 released from anion 266 to regenerate the $O_2$ gas 264 and fluid 262.

If the fluid flow to the inlet manifold 204 and the fluid flow from the outlet manifold 212 is regulated, the resulting fluid 262 at the discharge-side can be at a lower pressure. The resulting low-pressure fluid 262 in outlet manifold 212 can then be conveyed for further processing and/or use at 766, for example, as the input to a subsequent heat exchanger. At 766, it can be determined if the process 750 should be repeated, for example, as part of a heating/cooling or power generation cycle, in which case the process 750 returns to 752.

Although 752-766 are illustrated separately in FIG. 7B, it is contemplated that such process steps may occur contemporaneously, for example, during the continuous operation of a cycle. Moreover, the particular order of 752-766 in FIG. 7B has been chosen for explanatory purposes only and is not intended to be limiting. Indeed, in practical embodiments of the disclosed subject matter, the illustrated steps may occur before or during other steps.

Thus, an electrochemical module employing $O_2$ carrier gas can be constructed for fluid capture, fluid compression, and/or fluid expansion (and potential power recovery). In some embodiments, the electrochemical module can be constructed to be switchable between a first mode where a voltage is applied to the electrochemical module, the MEA has a first polarity, and fluid flow is in a first direction (e.g., a compression mode), and a second mode where a voltage is generated by the electrochemical module, the MEA has a second polarity opposite the first, and fluid flow is in a second direction opposite the first (e.g., an expansion mode). Regardless of the operational configuration, the electrochemical module may have a similar device construction.

Figure 2A:
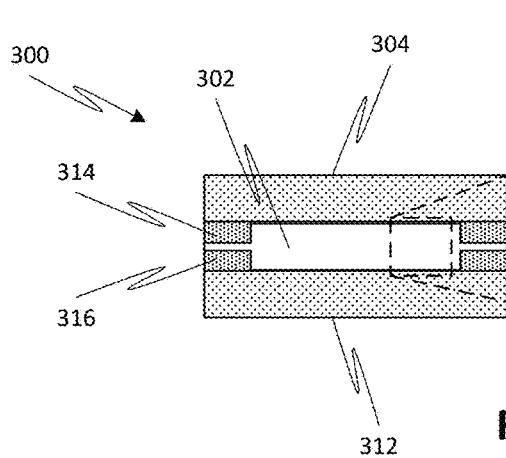
FIG. 2A is a simplified cross-sectional view of an electrochemical device, according to one or more embodiments of the disclosed subject matter.
Figure 2A:
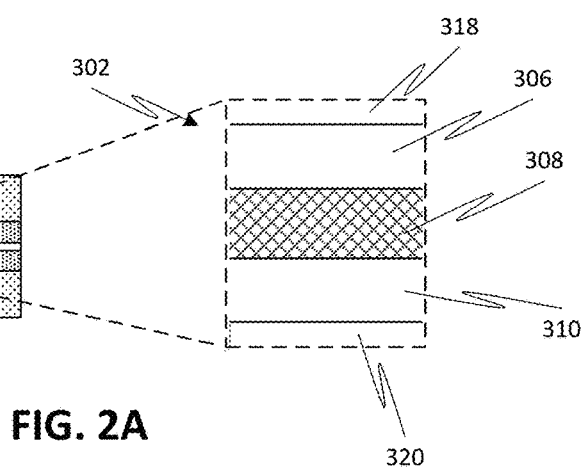

For example, FIGS. 2A-2B illustrate an exemplary device construction for an electrochemical cell 300 (or unit). The electrochemical cell 300 can include a membrane electrode assembly 302, which comprises AEM 308 between a pair of gas-permeable electrodes 306, 310. An end plate 304 with one or more channels 318 therein can serve as a first gas distribution manifold (inlet or outlet manifold depending on operation of cell 300). Layout and/or geometry of channel(s) 318 can be substantially the same or differ across end plate 304. An inlet/outlet face of end plate 304 can face electrode 306 such that channel(s) 318 are in fluid communication with MEA 302. A sealing gasket 314 can be disposed between end plate 304 and MEA 302 to prevent leakage of fluid and/or $O_2$ from device 300.

An opposing end plate 312 with one or more channels 320 therein can serve as a second gas distribution manifold (inlet or outlet manifold depending on operation of cell 300). Layout and/or geometry of channel(s) 320 can be substantially the same or differ across end plate 312. Moreover, layout and/or geometry of channel(s) 320 of end plate 312 can be substantially the same as the layout and/or geometry of channel(s) 318 of end plate 304, for example, when device 300 is constructed to reverse fluid flow to switch between first and second modes. Alternatively, layout and/or geometry of channel(s) 320 of end plate 312 can differ from the layout and/or geometry of channel(s) 318 of end plate 304. An inlet/outlet face of end plate 312 can face electrode 310 such that channel(s) 320 are in fluid communication with MEA 302. A sealing gasket 316 can be disposed between end plate 312 and MEA 302 to prevent leakage of fluid and/or $O_2$ from device 300.

The inlet/outlet face of end plate 304 may also be in electrical contact with electrode 306. Similarly, the inlet/outlet face of end plate 312 may be in electrical contact with electrode 310. Thus, the electric field can be applied to electrodes 306, 310 (and thus AEM 308) via end plates 304, 312, respectively. Alternatively, respective electrical connections may be routed through end plates 306, 312, through gaskets 314, 316, or through a portion of MEA 302 so as to apply the electric field to respective electrodes 306, 310 without directly energizing manifolds 304, 312.

The gas distribution manifolds 304, 312 may be formed of a material substantially resistant to degradation to electricity and/or the chemistry present during operation of the electrochemical device 300. Moreover, the manifolds 304, 312 may be constructed to resist the fluid pressures generated during operation and/or to conduct electricity and/or heat. For example, the manifolds 304, 312 may be constructed of graphite or stainless steel, although other materials are also possible according to one or more contemplated embodiments. When the fluid is $CO_2$, the use of stainless steel for the manifolds may be preferable over graphite in order to avoid corrosion.

Within each gas distribution manifold, the channel layout and/or geometry can be designed to account for pressure and fluid flow variations. For example, FIG. 3A shows a perspective view of the outlet face of an inlet manifold 350 for an electrochemical module. The manifold 350 has a serpentine channel 354 that can be used to ensure the fluid flows in only one direction from inlet 352, thereby enabling better distribution on the surface of the MEA. The width of the channel 354 can increase as it gets closer to the suction link 352 (inlet) in order to accommodate the flow change and pressure drop. Thus, channel cross-section at 358, which is farther from inlet 352, is reduced as compared channel cross-section 356, which is closer to inlet 352.

FIG. 3B shows a cross-sectional view 350a of the portions 356, 358 of FIG. 3A, where a width $W_2$ (i.e., at face 360 adjacent the MEA) of channel cross-section 358a is less than a width $W_1$ of channel cross-section 356a. However, it is also possible for the height of the channel 354 (i.e., from face 360 adjacent the MEA to a bottom of the channel 354) to be changed instead of the width. For example, FIG. 3C shows a cross-sectional view 350b of a variation where channel cross-section 358b has a width $W_1$ that is the same as that of channel cross-section 356b but has a height $H_2$ that is less than a height $H_1$ of channel cross-section 356b. However, it is also possible for both the height and the width of the channel 354 to be changed, for example, as illustrated by cross-sections 356c, 358c in the cross-sectional view 350c of FIG. 3D. Thus, the channel geometry can be designed to account for pressure and fluid flow variations, by changing a cross-sectional dimension (i.e., width, height, or width and height) of the channel based on its location with respect to an inlet or outlet of the manifold.

Similarly, FIG. 3E shows a perspective view of the inlet face of an outlet manifold 370 for an electrochemical module. Because the outlet manifold 370 receives higher pressure fluid, the manifold 370 can include 380 an array of substantially similar parallel channels to accommodate the higher pressure and flow distribution. A collection channel 374 can be disposed at one end of array 380 to collect the discharged working fluid and to direct it to a single outlet 372. The cross-sectional area of the collection channel 374 (e.g., the width, height, or combination of width and height) can increase as it gets closer to the discharge link 372 (outlet) in order to accommodate the increased mass flow and pressure drop. Thus, channel cross-section at 378, which is farther from outlet 372, is reduced as compared channel cross-section 376, which is closer to outlet 372. An optional constant-cross-section collection channel 382 can be disposed at an end of array 380 opposite the outlet 372 to allow fluid communication between channels in array 380. Alternatively, the end of array 380 opposite outlet 372 may be closed off, such that fluid collected in the channels of the array can only exit the respective channel at the end connecting to collection channel 374.

The discussion above has focused on a single electrochemical cell. However, the flow rate of fluid through a single electrochemical cell may be insufficient for practical embodiments. Thus, in some embodiments, multiple electrochemical unit cells (whether compressor, expander, switchable compressor/expander, or fluid capture module) can be coupled together (serially or in parallel) to form an electrochemical module stack. In this way, the flow rate can be increased and/or the desired pressure lift across the compressor can be achieved.

Figure 4A:
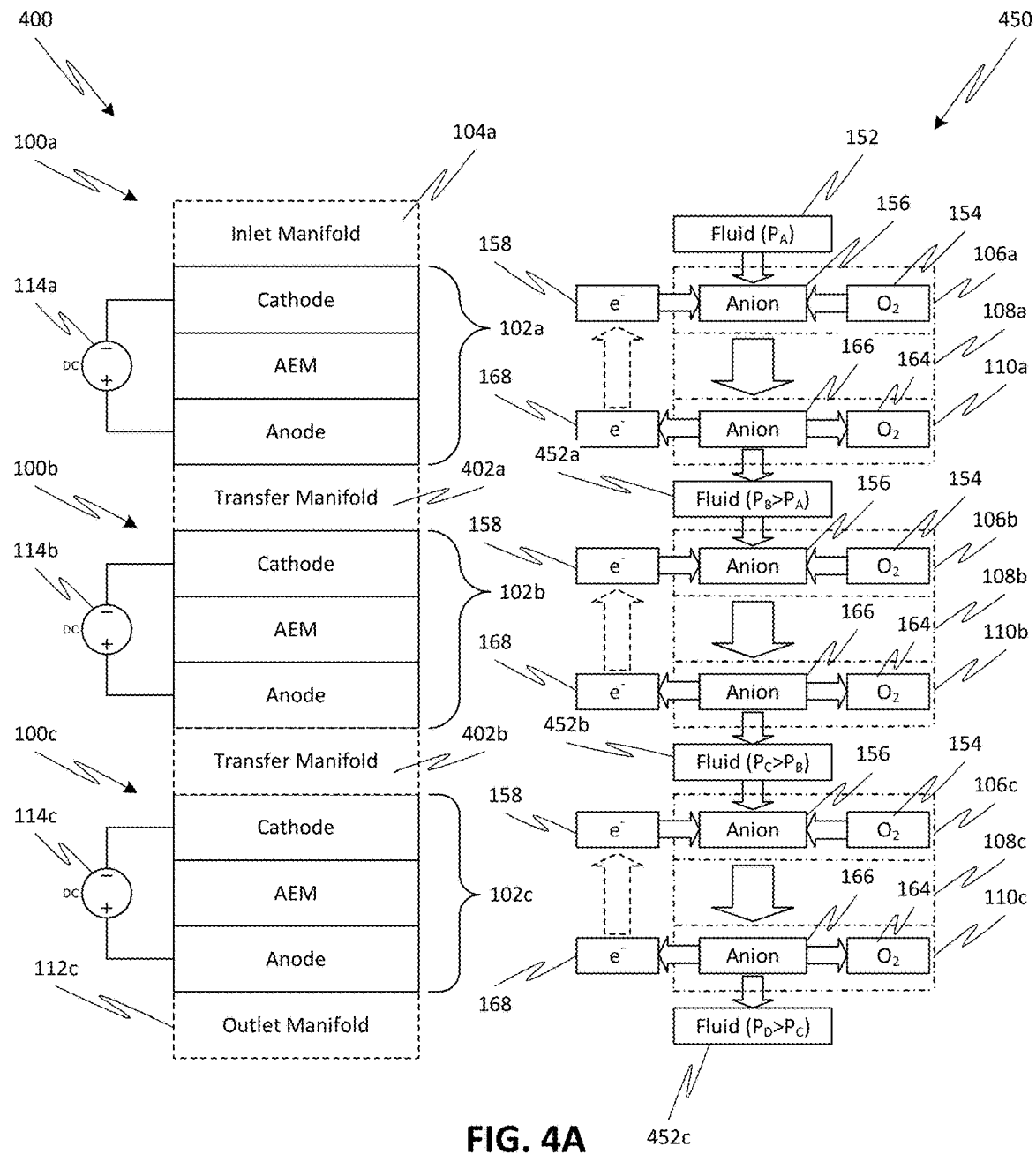
FIG. 4A is a simplified schematic diagram illustrating aspects of electrochemical compression with stacked devices, according to one or more embodiments of the disclosed subject matter.

For example, FIG. 4A illustrates a configuration (and corresponding electrochemical process 450) of electrochemical compressor unit cells 100a-100c coupled together in series to form an electrochemical compressor stack 400. The fluid 152 at a relatively low-pressure $P_A$ enters the stack 400 via inlet manifold 104a. In a first stage configured by unit cell 100a, the fluid 152 is driven through the MEA 102a by electric field applied by power supply 114a, as described above with respect to FIG. 1A, to yield fluid 452a at a pressure $P_B$ higher than $P_A$. The fluid 452a is transferred from the first stage to a second stage, configured by unit cell 100b, by a transfer manifold 402a. In the second stage, the fluid 452a is transported through MEA 102b by electric field applied by power supply 114b, as described above with respect to FIG. 1A, to yield fluid 452b at a pressure $P_C$ higher than $P_B$. The process repeats for a third stage, configured by unit cell 100c, to yield fluid 452c at a final pressure $P_D$ higher than $P_C$. Of course, although three serial stages 100a-100c are illustrated in FIG. 4A, additional or fewer serial stages are also possible according to one or more contemplated embodiments.

For example, each transfer manifold 402a, 402b can be a combination of an outlet manifold (e.g., end plate 370 in FIG. 3E) and an inlet manifold (e.g., end plate 350 in FIG. 3A) where the outlet port 372 of the outlet manifold is coupled to the inlet port 352 of the inlet manifold. Alternatively, each transfer manifold 402a, 402b can include a channel geometry that directly conveys fluid from one MEA 102 to the next MEA 102 in the sequence. However, after each unit cell 100 stage, the density of the transported fluid increases along with the pressure. Thus, the respective channel size (i.e., cross-sectional geometry) of the transfer manifold 402 may decrease with each subsequent stage, such that transfer manifold 402b has a smaller channel cross-section and/or total volume as compared to transfer manifold 402a.

As noted above, the power consumed in the electrochemical compression can generate heat, which may affect performance of the vapor compression cycle. Thus, in embodiments, the generated heat may be removed, for example, by including cooling elements in the transfer manifolds 402a-402b and/or outlet manifold 112c. For example, when the transfer manifold 402a, 402b is configured as a combination of outlet manifold and inlet manifold, an array of cooling channels (e.g., in a thermally conductive plate) may be disposed between the adjacent manifolds (i.e., sandwiched between the outlet and inlet end plates in a stack) to carry away heat by flowing a fluid therethrough. Alternatively or additionally, thermal management techniques similar to those applied for cooling of ion exchange membranes in hydrogen fuel cells may be applied to regulate a temperature of the disclosed electrochemical modules.

Figure 4B:
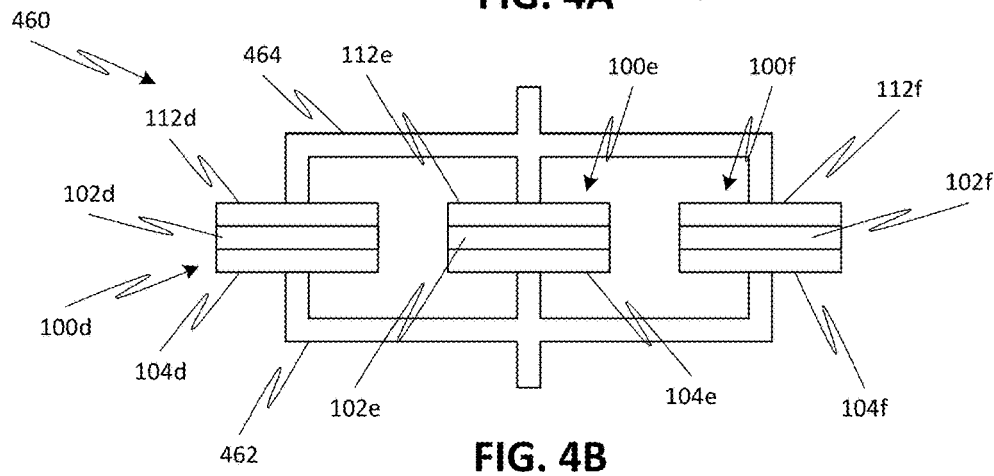
FIG. 4B is a simplified schematic diagram illustrating aspects of electrochemical compression with parallel stacked devices, according to one or more embodiments of the disclosed subject matter.

FIG. 4B illustrates an exemplary configuration of electrochemical compressor unit cells 100d-100f coupled together in parallel to form an electrochemical compressor stack 460. An inlet conduit 462 can direct fluid at the suction side (i.e., at a relatively low pressure) in parallel to the respective inlet manifold 104d-104f of each compressor unit cell 100d-100f. The unit cells 100d-100f can operate in parallel to pass the fluid through their respective MEAs 102d-102f to their respective outlet manifold 112d-112f, for example, as described above with respect to FIG. 1A. The resulting higher-pressure fluid can be collected from each unit cell 100d-100f by an outlet conduit 464, thereby producing a greater fluid flow rate than would otherwise be possible using only a single unit cell.

Of course, although three parallel stages 100d-100f are illustrated in FIG. 4B, additional or fewer parallel stages are also possible according to one or more contemplated embodiments. Moreover, although the serial configuration of FIG. 4A has been illustrated separately from the parallel configuration of FIG. 4B, it is also possible that the configurations may be combined. For example, each of the unit cells 100d-100f in FIG. 4B can be formed of the stack of serial unit cells 100a-100c in FIG. 4A (i.e., forming a 3×3 configuration of unit cells).

Figure 5A:
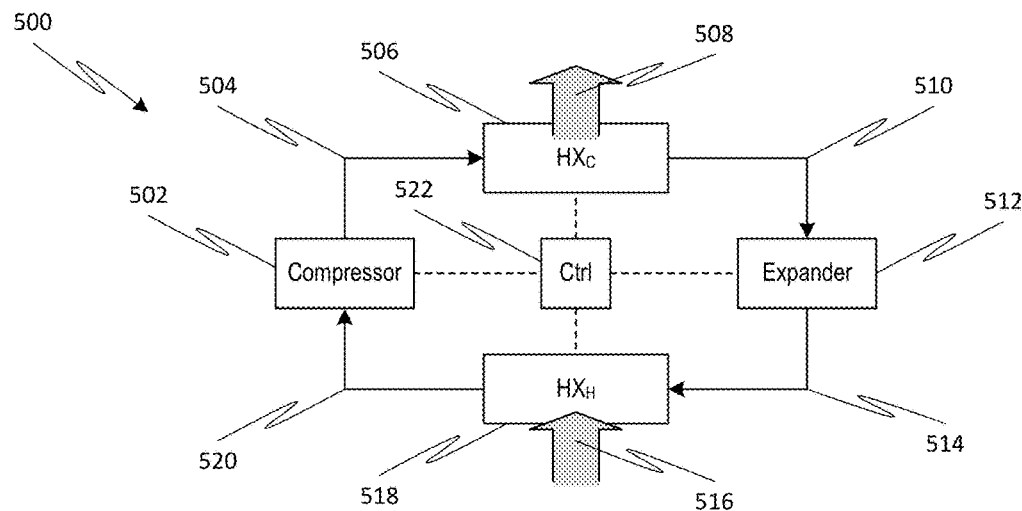
FIG. 5A is a simplified schematic diagram of a vapor compression system where an electrochemical device can be employed as one or more components, according to one or more embodiments of the disclosed subject matter.

As noted above, embodiments of the disclosed electrochemical modules can be employed in a vapor compression system employing the fluid as a working fluid (i.e., refrigerant), for example, as illustrated in FIG. 5A. The vapor compression system 500 may have a substantially conventional configuration other than the use of the electrochemical modules(s) with $O_2$ carrier gas. For example, the vapor compression system 500 can employ $CO_2$ as working fluid. Thus, system 500 has a heat exchanger 506 operating as a condenser, which transfers heat 508 from the $CO_2$ circulating therethrough, and a heat exchanger 518 operating as an evaporator, which transfer heat 516 to the $CO_2$ circulating therethrough. A controller 522 can be operatively coupled to the different components of the system 500 to control operation and performance of the system, for example, to achieve a desired conditioned air temperature via exchange of heat 508 and/or 516.

In system 500, the compressor 502 receives saturated $CO_2$ vapor at 520 and compresses it to generate a higher-pressure $CO_2$ vapor at 504. The $CO_2$ vapor at 504 may be superheated vapor. As noted above, heat may be removed from compressor 502 (i.e., from the discharged $CO_2$) such that the temperature of discharged $CO_2$ is controlled for optimal performance of the vapor compression system 500 (e.g., to have a temperature at or slightly above that of the cooling heat exchanger 506). Heat 508 is transferred from $CO_2$ vapor 504 via heat exchanger 506 to condense the $CO_2$. After condenser 506, the $CO_2$ at 510 may be saturated liquid. The expander 512 may receive the saturated $CO_2$ liquid 510 and further reduce a pressure thereof to generate a lower pressure $CO_2$ at 514, which may be a liquid-vapor $CO_2$ blend. Heat 516 is transferred to lower pressure $CO_2$ 514 via heat exchanger 518 to evaporate the $CO_2$. The resulting saturated $CO_2$ vapor 520 can be conveyed back to compressor 502, where the cycle can repeat.

When the operating high-side temperature becomes higher than the critical temperature of $CO_2$ and $O_2$ mixture, the heat 508 rejection process becomes a supercritical gas cooling process. The entire cycle of system 500 therefore becomes a trans-critical cycle, and there is no two-phase condensation for heat 508 rejection nor evaporation for heat 516 absorption. Thus, heat exchanger 506 operates as a gas cooler rather than condenser while heat exchanger 518 operates as a gas heater rather than evaporator.

Figure 5B:
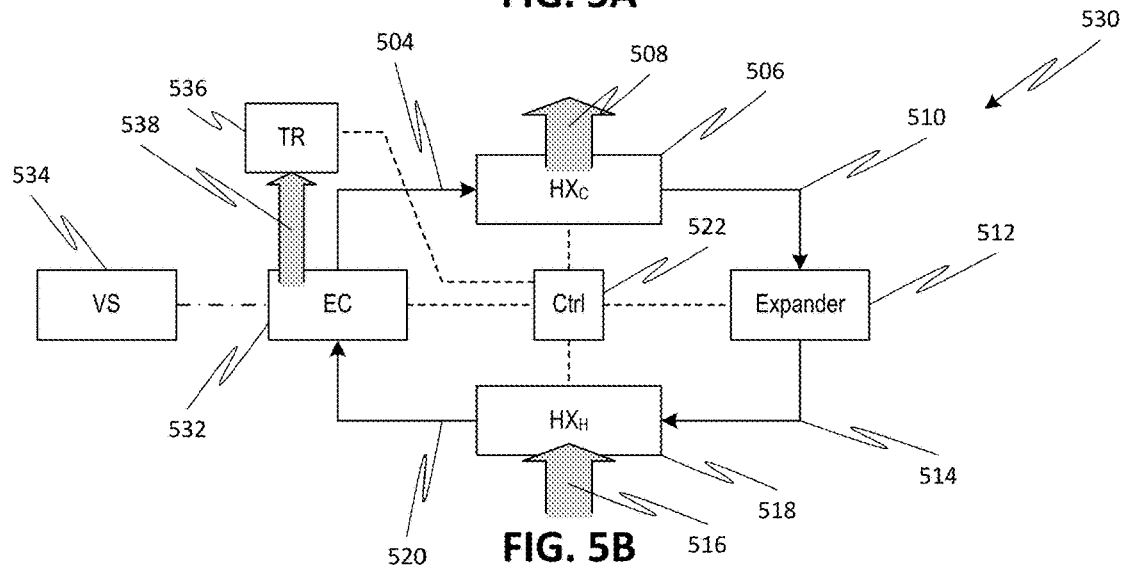
FIG. 5B illustrates an exemplary configuration of the system of FIG. 5A where an electrochemical device is used as a compressor, according to one or more embodiments of the disclosed subject matter.

The electrochemical module may be employed as compressor 502 and/or expander 512 in system 500. For example, FIG. 5B shows a vapor compression system 530 where an electrochemical module 532 operates as compressor in the thermodynamic cycle. The electrochemical module 532 may be similar to the module 100 illustrated in FIG. 1A and described above, while the expander 512 may be a conventional device, such as an expansion or throttle valve. A voltage source 534 can be used to apply the electric field between electrodes of the MEA of the electrochemical compressor 532, thereby transporting the fluid through the AEM of the compressor 532. A thermal regulation unit 536 can transfer heat 538 from the electrochemical compressor 532 and/or the fluid discharged from the compressor 532 to yield a substantially optimal temperature of the fluid for use by system 500.

Figure 5C:
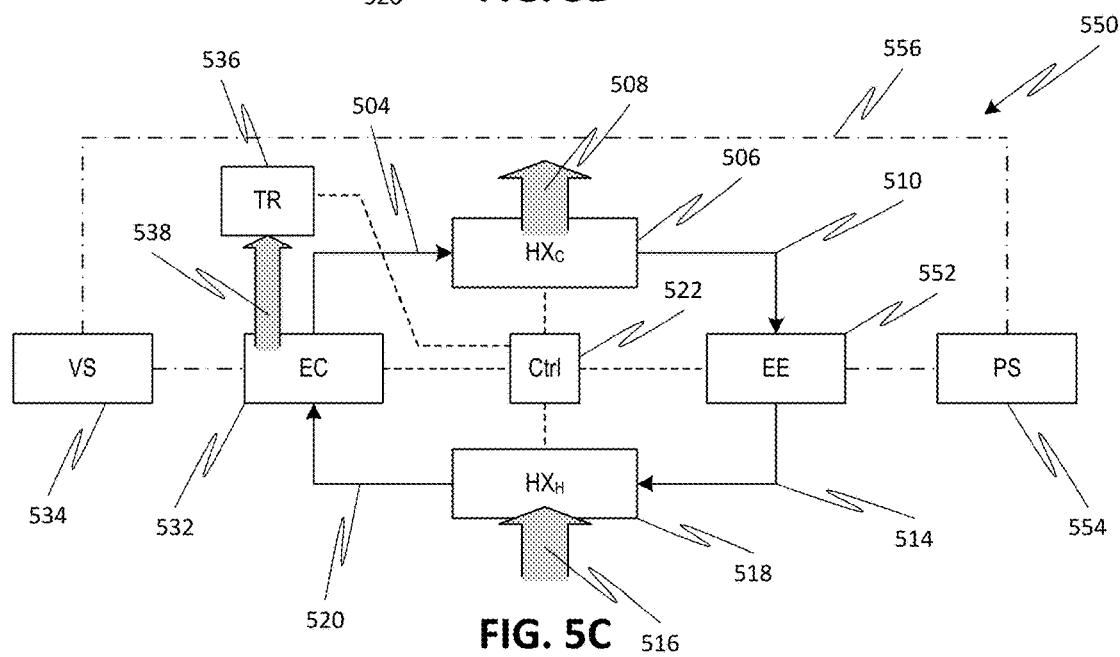
FIG. 5C illustrates another exemplary configuration of the system of FIG. 5A where electrochemical devices are used as compressor and expander, respectively, according to one or more embodiments of the disclosed subject matter.

Alternatively or additionally, the expander 512 of FIG. 5B can be replaced with an electrochemical module 552, for example, as shown in vapor compression system 550 of FIG. 5C. For example, the electrochemical module 552 may be similar to the module 200 illustrated in FIG. 1B and described above. Thus, as the fluid passes through the MEA of the electrochemical expander 552, electrical power may be harvested and used for powering different components of vapor compression system 550. For example, the harvested electrical power can power (at least in part) voltage source 534 of the electrochemical compressor 532 via power line 556. Alternatively or additionally, all or some of the harvested electrical power can be stored, for example, by charging power storage device 554 (e.g., battery).

Figure 5D:
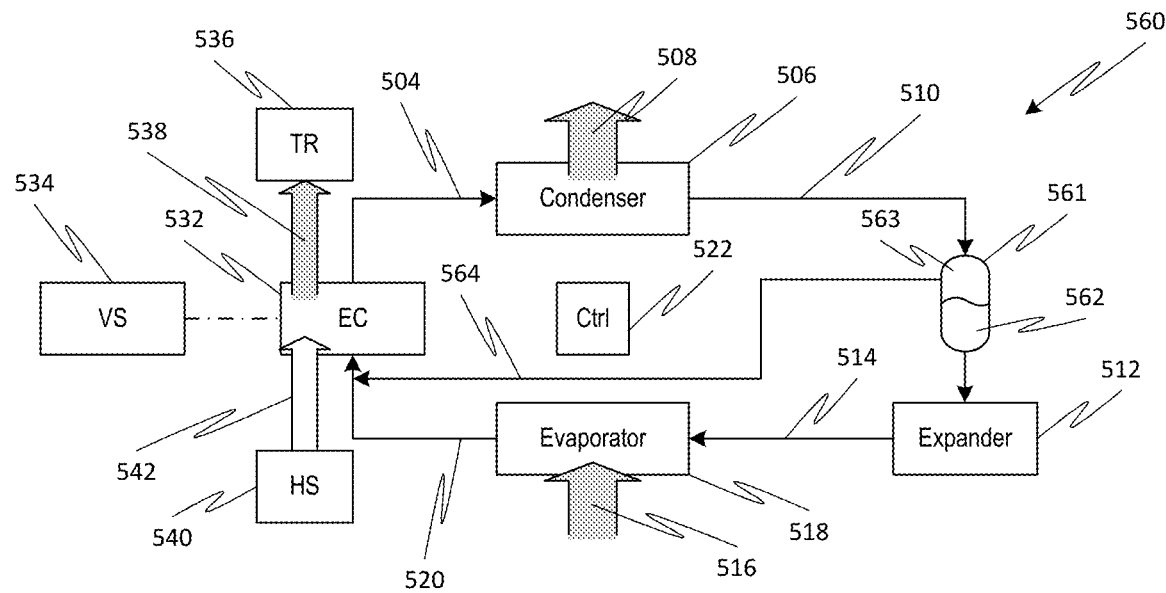
FIG. 5D illustrates another exemplary configuration of the system of FIG. 5A where an electrochemical device is used as a compressor with a phase separator for carrier gas recovery, according to one or more embodiments of the disclosed subject matter.

The circulation of carrier gas in the vapor compression system may impact efficiency of the system, for example, by undermining heat exchanger performance. Thus, in embodiments, the transport of the carrier gas through the system may be limited by one more capture components. For example, FIG. 5D illustrates an exemplary configuration of a vapor compression system 560, where a phase separator 561 is used to capture carrier gas. In particular, the phase separator 561 is disposed in the flow path between the condenser 506 and expander 512 and receives output 510 from condenser 506. The system 560 can be configured such that, at a temperature and pressure in the phase separator 561, the carrier gas is in the vapor phase while the working fluid is in the liquid phase. Any carrier gas thus separates from the liquid phase 562 of the working fluid and coalesces at 563. The coalesced carrier gas 563 can be siphoned from the phase separator 561 and directed via input line 564 for reuse by the electrochemical compressor 532. Meanwhile, the substantially-carrier-gas-free working fluid 562 can be output from the phase separator 561 to expander 512.

Figure 5E:
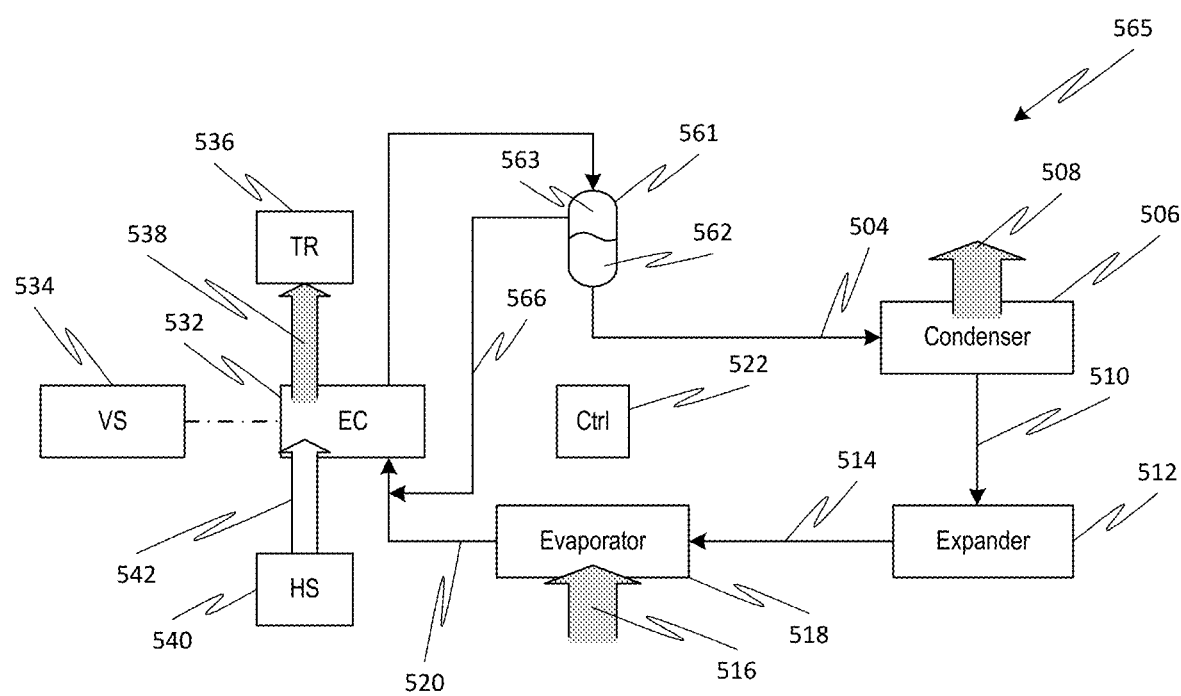
FIG. 5E illustrates a variation of the configuration of FIG. 5D, where a phase separator is used for carrier gas recovery, according to one or more embodiments of the disclosed subject matter.

It is also possible to dispose the phase separator 561 at locations within the flow path of the vapor compression cycle different from that illustrated in FIG. 5D in order to capture and reuse the carrier gas exiting the electrochemical device 532. For example, FIG. 5E illustrates another exemplary configuration of a vapor compression system 565, where phase separator 561 is disposed in the flow path between the electrochemical device 532 and the condenser 506. The system 565 can be configured such that, at a temperature and pressure in the phase separator 561, the carrier gas is in the vapor phase and separates from the working fluid 562. The separated carrier gas 563 can be siphoned from the phase separator 561 and directed via input line 566 for reuse by the electrochemical compressor 532. The substantially-carrier-gas-free working fluid 562 can then be output from the phase separator 561 to condenser 506 for heat transfer.

Figure 6A:
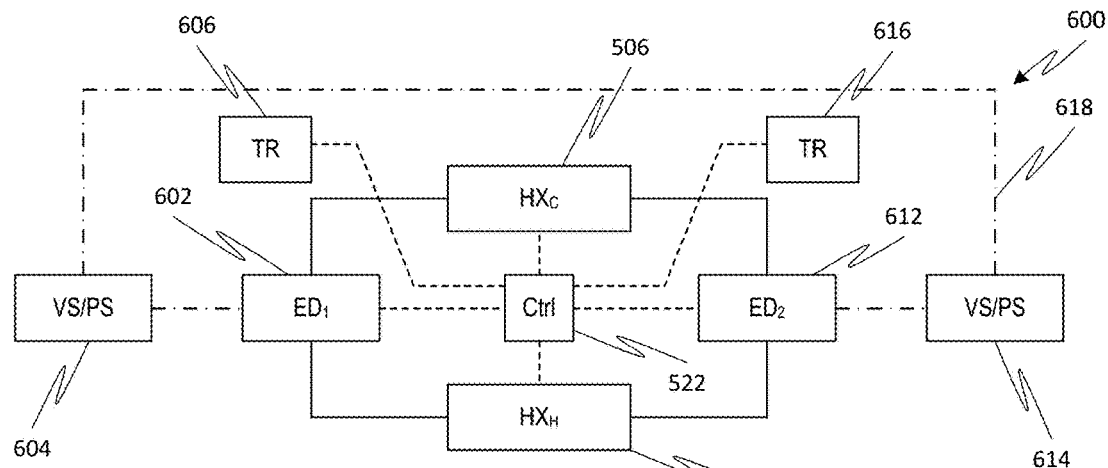
FIG. 6A is a simplified schematic diagram of an exemplary two-mode vapor compression system where electrochemical devices can switch between compression and expansion, according to one or more embodiments of the disclosed subject matter.
Figure 8:
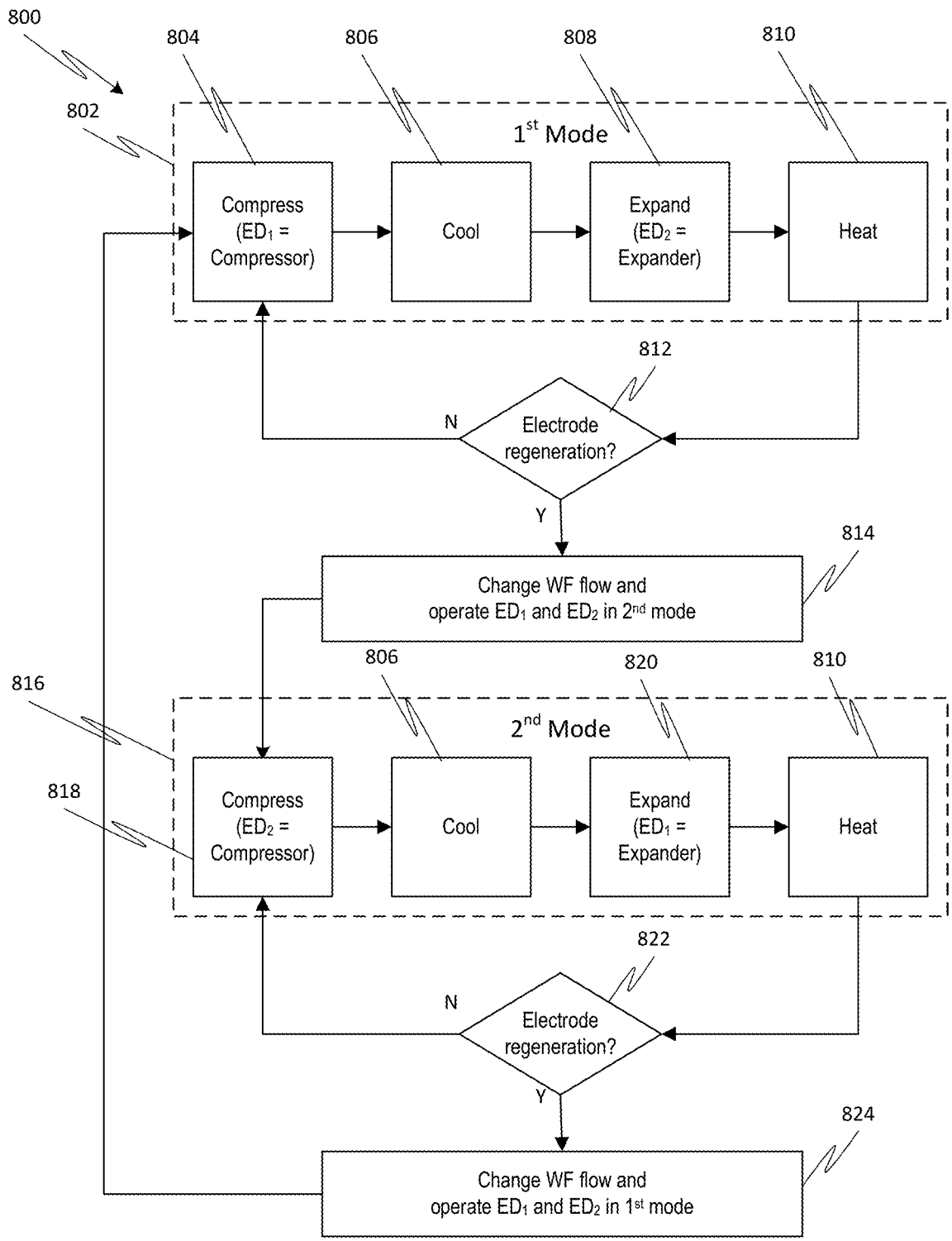
FIG. 8 is an exemplary process flow diagram for operation of a two-mode vapor compression system employing switchable electrochemical devices, according to one or more embodiments of the disclosed subject matter.

Alternatively or additionally, the carrier gas can be prevented from circulating in the vapor compression system by constructing each electrochemical device with carrier-gas-absorbing electrodes. The electrochemical devices can switch between operation as either a compressor or power-harvesting evaporator, depending on its mode of operation. For example, FIG. 6A shows a vapor compression system 600 with a first electrochemical module 602 in a flow path between heat exchanger 518 and heat exchanger 506, and a second electrochemical module 612 in a complementary flow path between the heat exchanger 506 and the heat exchanger 518. FIG. 8 describes operation 800 of the vapor compression system 600 in a first mode 802 and a second mode 816.

The electrodes of the MEA in each electrochemical module 602, 612 can be formed, or having a coating, of $LaMnO_3$ perovskite so as to store the $O_2$ carrier gas therein and prevent $O_2$ from circulating in the cycle outside of the respective MEA. Each electrochemical module 602, 612 can have a respective power module 604, 614, which is switchable between a power supply mode and a power storage mode, and a respective thermal regulation unit 606, 616 for removing heat during respective compression and/or expansion processes. A power line 618 can electrically connect the power modules 604, 614 together so as to share electrical power therebetween.

Figure 6B:
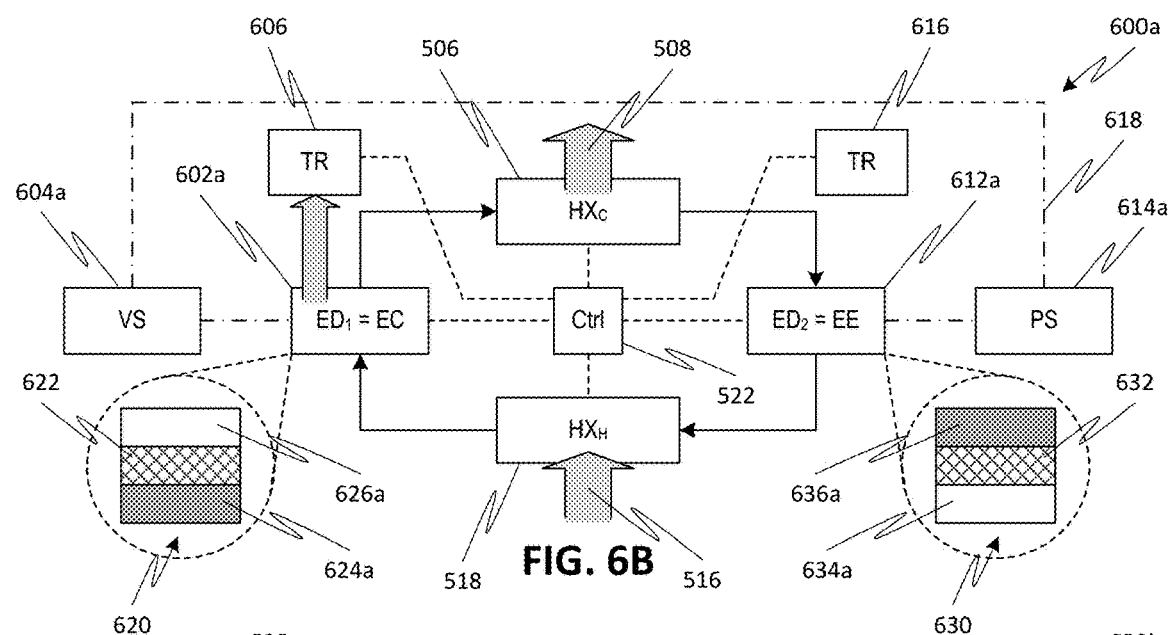
FIGS. 6B-6C illustrate exemplary first and second modes of operation for the system of FIG. 6A, according to one or more embodiments of the disclosed subject matter.

In a first mode 600a of operation illustrated in FIG. 6B (802 in FIG. 8), the flow of fluid is in a clockwise direction, with the first electrochemical module 602a operating as compressor and the second electrochemical module 612a operating as power-harvesting expander. The first power module 604a thus acts as a voltage source for the electrochemical compressor 602a, while the second power module 614a acts a power storage for the electrochemical expander 612a.

The compression 804 of fluid by compressor 602a may be in a similar manner as described above with respect to FIG. 7A. For example, during the first mode 600a, at the cathode 624a of the MEA 620 of the electrochemical compressor 602a, the fluid electrochemically reacts with $O_2$ in the $LaMnO_3$ perovskite of cathode 624a to produce the fluid anion. The fluid anion is transferred across the AEM 622 to anode 626a, where the anion is electrochemically dissociated back to the fluid and $O_2$. At the anode 626a, the $O_2$ reacts with the material of the cathode to form $LaMnO_3$ perovskite.

The compressed fluid is conveyed to heat exchanger 506, where heat is transferred from the fluid to cool (and in some configurations condense) the working fluid at 806. The cooled working fluid is conveyed to expander 612a. During the first mode 600a, the expansion 808 of working fluid by expander 612a may in a similar manner as described above with respect to FIG. 7B (i.e., the reverse operation from that of compressor 602a). For example, during the first mode 600a, at the anode 636a of the MEA 630 of the electrochemical expander 612a, the working fluid electrochemically reacts with $O_2$ in the $LaMnO_3$ perovskite of anode 636a to produce the fluid anion. The anion is transferred across the AEM 632 to cathode 634a, where the anion is electrochemically dissociated back to the working fluid and $O_2$. At the cathode 634a, the $O_2$ reacts with the material of the cathode to form $LaMnO_3$ perovskite. The expanded working fluid is conveyed to heat exchanger 518, where heat is transferred to the fluid to heat (and in some configuration evaporate) the working fluid at 810. The heated working fluid is conveyed back to compressor 602a.

At the beginning of the first mode 600a, the cathode 624a has substantially all of the hydrogen in MEA 620 (i.e., is fully charged with $O_2$), while the anode 626b has substantially none of the $O_2$ (i.e., is fully discharged). Similarly, at the beginning of the first mode 600a, the anode 636a has substantially all of the $O_2$ in MEA 630, while the cathode 634a has substantially none of the $O_2$. The processes of the first mode 600a can continue until the inlet electrodes (i.e., cathode 624a of compressor 602a and anode 636a of expander 612a) are fully discharged, i.e., all of the $O_2$ therein has been transferred through their respective AEM 622, 632 to charge the corresponding outlet electrodes (i.e., anode 626a of compressor 602a and cathode 634a of expander 612a). Thus, at 812, the process 800 can determine if regeneration of electrodes is required.

Once the inlet electrodes 624a, 636a have been fully discharged (i.e., depleted of $O_2$), system 600 can switch to a second mode at 814. In the second mode 600b of operation, illustrated in FIG. 6C, the flow of fluid is reversed from the first mode 600a, i.e., flows in a counter-clockwise direction, and/or the polarity of the electrochemical modules can be reversed. In addition, the first electrochemical module 602b is reconfigured to operate as an expander while the second electrochemical module 612b is reconfigured to operate as a compressor. The first power module 604b thus acts as a power storage for the electrochemical expander 602b, and the second power module 614b acts as a voltage source for the electrochemical compressor 612b. In effect, the reversed flow and/or polarity of the second mode 600b is equivalent to the first and second electrochemical modules 602a, 612a switching places in the first mode 600a.

Thus, the compression 818 of working fluid by compressor 612b may be in a manner similar to that described above with respect to FIG. 7A, while the expansion 820 by expander 602b may be in a manner similar to that described above with respect to FIG. 7B. At the beginning of the second mode 600b, the cathode 634b of the electrochemical compressor 612b has substantially all of the $O_2$ in MEA 630 (e.g., having been charged with $O_2$ during the first mode 600a), while the anode 636b has substantially none of the $O_2$ (e.g., having been discharged of $O_2$ during the first mode 600a). Similarly, at the beginning of the second mode 600b, the anode 626b has substantially all of the $O_2$ in MEA 620, while the cathode 624b has substantially none of the $O_2$. The processes of the second mode 600b can continue until the inlet electrodes (i.e., cathode 634b of compressor 612b and anode 626b of expander 602b) are fully discharged. Thus, at 822, the process 800 can determine if regeneration of electrodes is required. If so, the process 800 can switch system 600 back to the first mode of operation at 824. Such switching between first and second modes may be controlled by controller 522, for example, by monitoring the inlet or outlet electrodes of the electrochemical modules 602, 612 to determine an $O_2$ charge/discharge state thereof. The system 600 can thus repeatedly switch between first and second modes of operation to take advantage of the $O_2$ charging status of the electrodes of the MEA of the electrochemical devices 602, 612.

Although 804-810 of the first mode are illustrated separately and 818, 806, 820, and 810 of the second mode are illustrated separately in FIG. 8, it is contemplated that such process steps may occur contemporaneously in each respective mode, for example, during the continuous operation of a vapor compression cycle in that respective mode. Moreover, the particular order of 804-810 and 818, 806, 820, and 810 in FIG. 8 has been chosen for explanatory purposes only and is not intended to be limiting. Indeed, in practical embodiments of the disclosed subject matter, the illustrated steps may occur before or during other steps.

Figure 6C:
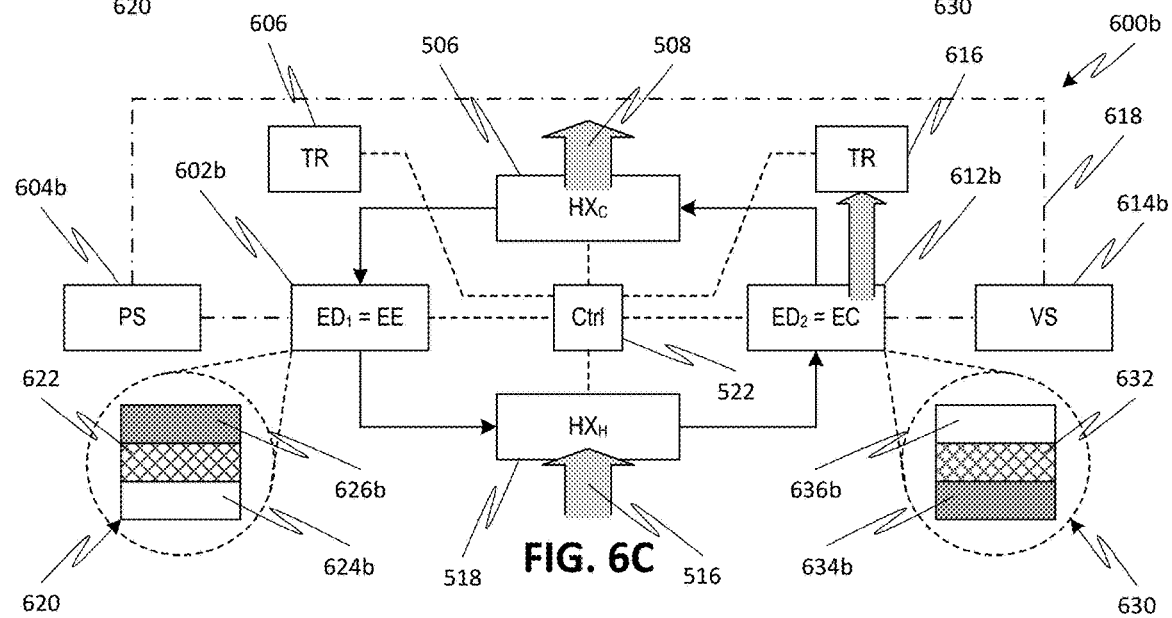

Although FIGS. 6B-6C indicate that the flow through the heat exchanger 506 and heat exchanger 518 are reversed in switching between first mode 600a and second mode 600b, it is also possible that the flow direction through the heat exchangers 506, 518 may be kept the same regardless of the operating mode, according to one or more contemplated embodiments. Indeed, the working fluid flow to/from each heat exchanger 506, 518 may be rerouted via appropriate switches, valves, and/or other flow channels to achieve the same effect of switching between first 600a and second 600b modes without otherwise altering the flow of working fluid through the respective heat exchanger 506, 518.

Figure 6D:
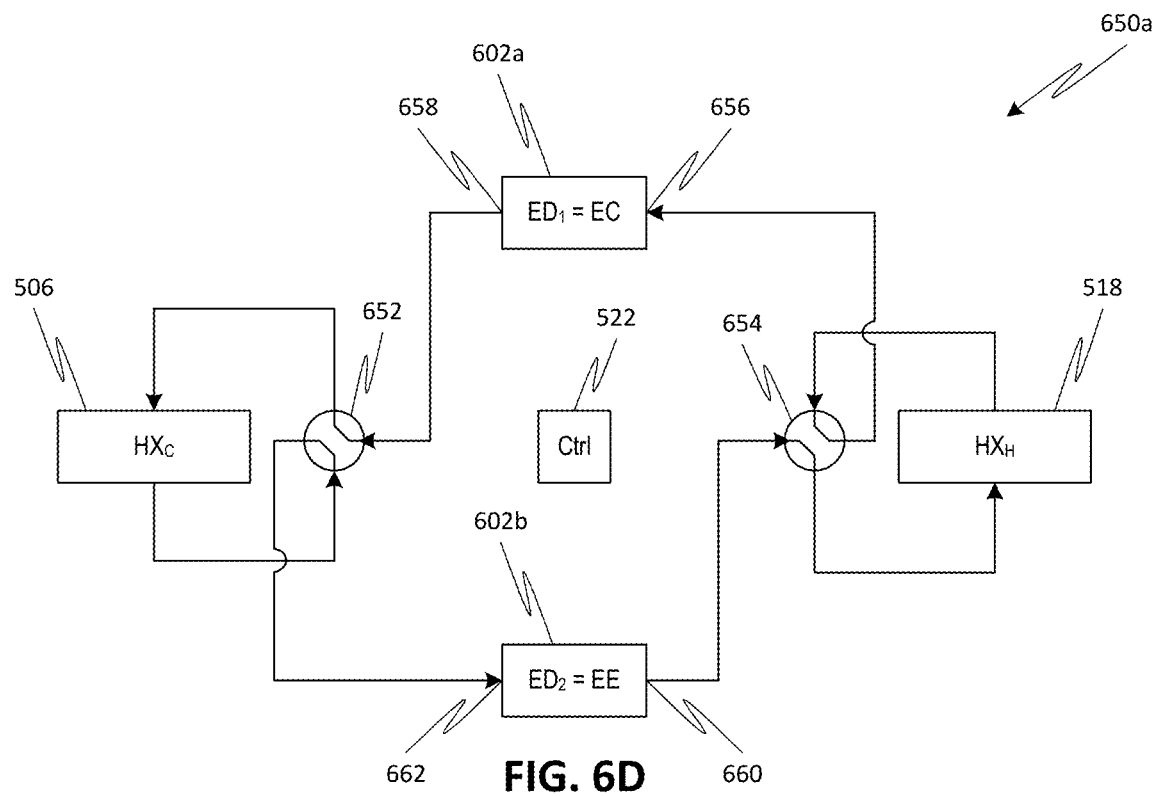
FIGS. 6D-6E illustrate exemplary first and second modes of operation of another exemplary two-mode vapor compression system, according to one or more embodiments of the disclosed subject matter.
Figure 6E:
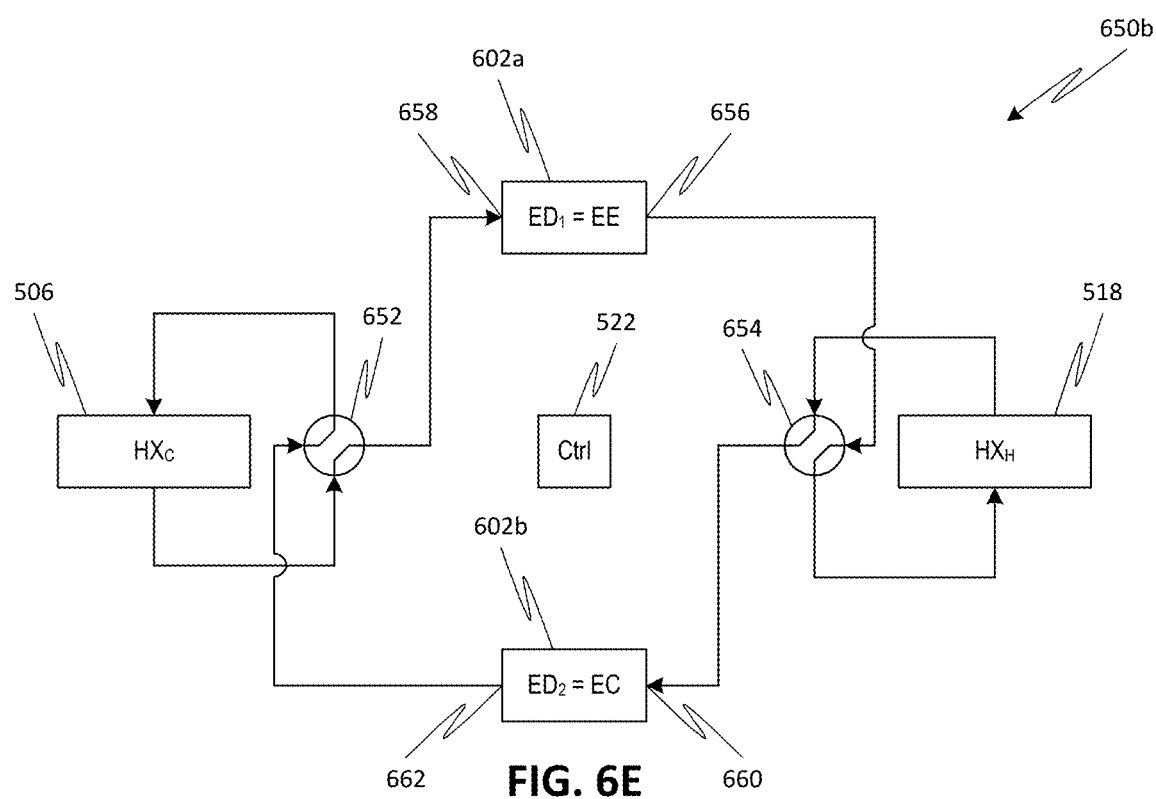

For example, FIGS. 6D-6E illustrate an exemplary setup for a system where the direction of working fluid flow through heat exchangers 506, 518 is maintained regardless of the mode of operation 650a, 650b. The system can include a first valve 652 for routing flow to/from condenser 506 and a second valve 654 for routing flow to/from evaporator 518. Each valve 652, 654 can be a 4-way valve.

In a first mode 650a, the first electrochemical device 602a operates as the compressor while the second electrochemical device 602b operates as the expander. Valve 652 is at a first orientation that routes discharge from port 658 of the first electrochemical device 602a to the inlet of cooling heat exchanger 506, and that routes discharge from the cooling heat exchanger 506 to port 662 of the second electrochemical device 602b. Valve 654 is at a first orientation that routes discharge from port 660 of the second electrochemical device 602b to the inlet of heating heat exchanger 518, and that routes discharge from the heating heat exchanger 518 to port 656 of the first electrochemical device 602a. In effect, the first mode 650a may operate similar to the first mode 600a of FIG. 6B, with the mode continuing until inlet electrodes of the respective electrochemical devices 602a, 602b are exhausted.

Once the inlet electrodes have been exhausted (or when regeneration of electrodes is otherwise desired), the system can switch to the second mode 650b, as illustrated in FIG. 6E. In particular, valve 652 changes to a second orientation that routes discharge from cooling heat exchanger 506 to port 658 of the first electrochemical device 602a, and that routes discharge from port 662 of the second electrochemical device 602b to the inlet of the cooling heat exchanger 506. Valve 654 changes to a second orientation that routes discharge from the heating heat exchanger 518 to port 660 of the second electrochemical device 602b, and that routes discharge from port 656 of the first electrochemical device 602a to the inlet of heating heat exchanger 518. In the second mode 650b, the first electrochemical device 602a and the second electrochemical device 602b operate as expander and compressor, respectively. In effect, the second mode 650b may operate similar to the second mode 600b of FIG. 6C, with the mode continuing until inlet electrodes of the respective electrochemical devices 602a, 602b, are exhausted.

As compared to the first mode 650a, the direction of working fluid flow through the electrochemical devices 602a, 602b in the second mode 650b has been reversed. Moreover, the functions of the electrochemical devices 602a, 602b have been switched. Thus, the first electrochemical device 602a serves as compressor in the first mode 650a and as expander in the second mode 650b, and vice versa for the second electrochemical device 602b. However, the direction of working fluid flow through the cooling heat exchanger 506 (e.g., condenser) and heating heat exchanger 518 (e.g., evaporator) remains the same regardless of operation mode 650a, 650b.

Figure 6F:
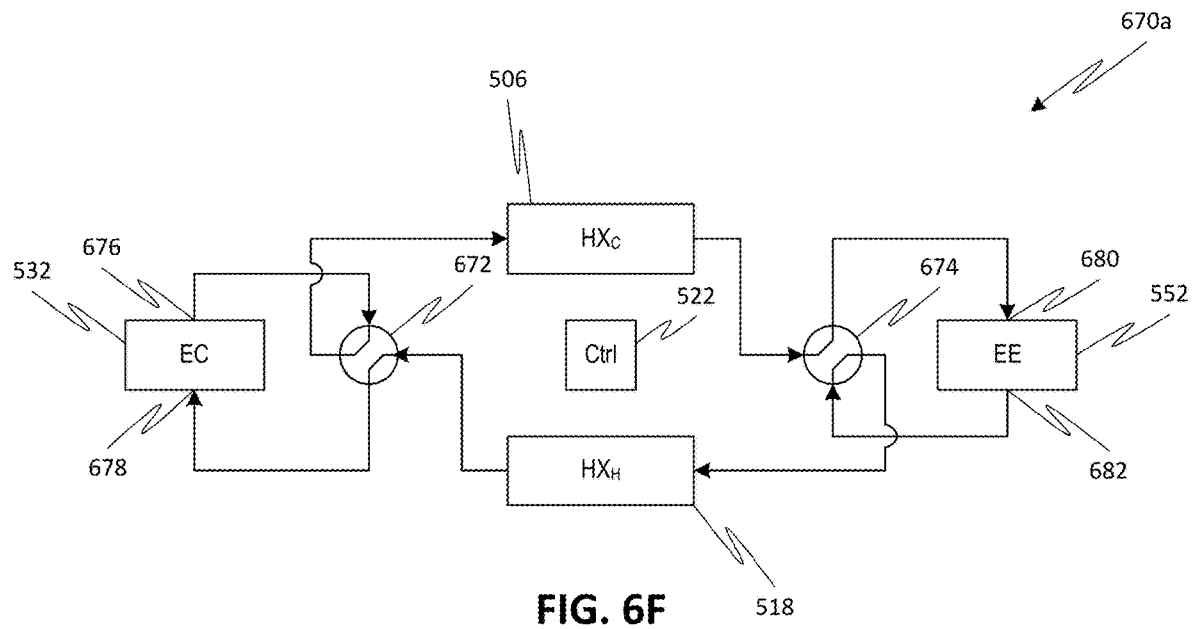
FIGS. 6F-6G illustrate exemplary first and second modes of operation of yet another exemplary two-mode vapor compression system, according to one or more embodiments of the disclosed subject matter.
Figure 6G:
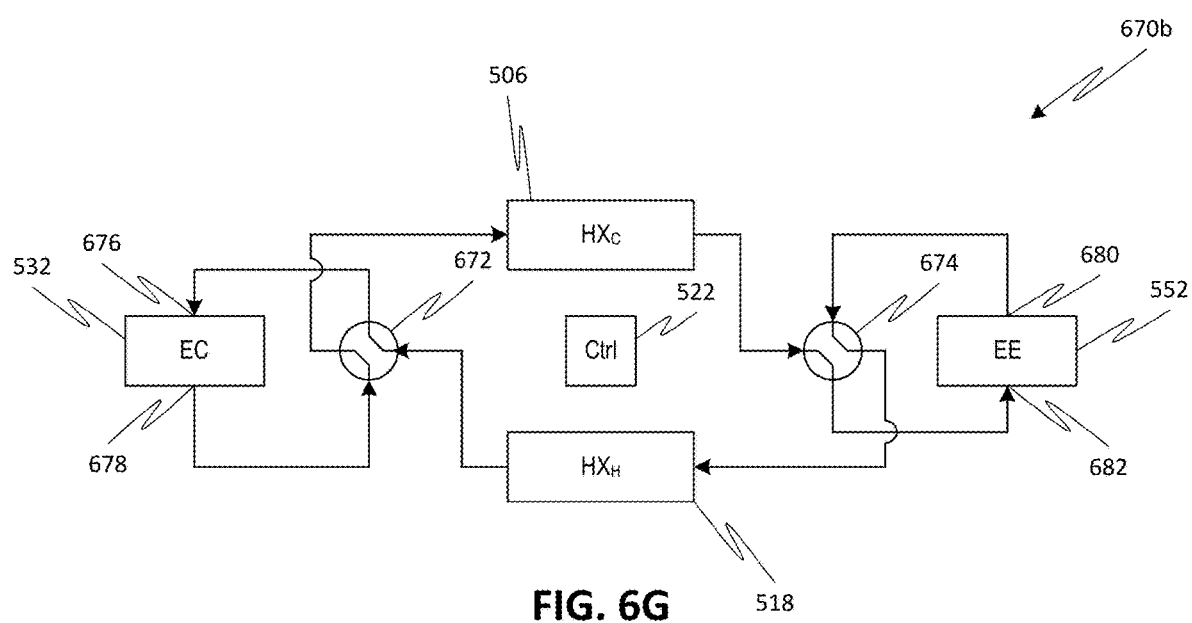

Other configurations for regeneration of $O_2$ storage electrodes in electrochemical devices are also possible according to one or more contemplated embodiments. For example, FIGS. 6F-6G illustrate an exemplary setup for a system where the direction of working fluid flow through the electrochemical devices 532, 552 is reversed to regenerate the electrodes while maintaining the respective functions of the electrochemical devices 532, 552. The system can include a first valve 672 for routing flow to/from the electrochemical compressor 532 and a second valve 674 for routing flow to/from the electrochemical evaporator 552. For example, each valve 672, 674 can be a 4-way valve.

In a first mode 670a, valves 672, 674 are in a respective first orientation. Thus, valve 672 routes working fluid discharged from port 676 of compressor 532 to the inlet of cooling heat exchanger 506, and routes working fluid discharged from heating heat exchanger 518 to port 678 of compressor 532. Valve 674 routes working fluid discharged from port 682 of expander 552 to the inlet of heating heat exchanger 518, and routes working fluid discharged from cooling heat exchanger 506 to port 680 of expander 552. In effect, the first mode 670a may operate similar to the first mode 600a of FIG. 6B, with the mode continuing until inlet electrodes of the respective cooling heat exchanger 532 and heating heat exchanger 552 are exhausted.

Once the inlet electrodes have been exhausted (or when regeneration of electrodes is otherwise desired), the system can switch to the second mode 670b, as illustrated in FIG. 6G. In particular, valves 672, 674 change to respective second orientations, so as to reverse a direction of the flow through electrochemical devices 532, 552. However, unlike the second mode 650b of FIG. 6B, the electrochemical devices of the second mode 670b continue to process the working fluid in the same manner as the first mode 670a, i.e., device 532 as compressor and device 552 as expander. In effect, the second mode 670b may operate similar to the second mode 600b of FIG. 6C, with the mode continuing until inlet electrodes of the respective electrochemical devices 532, 552 are exhausted.

In another example of a system for electrode regeneration, an electrochemical device may have a pair of electrochemical modules that operate in an alternating manner to provide a particular thermodynamic process (e.g., electrochemical device acting as compressor). When the cathode of a first of the electrochemical modules becomes depleted, the system may switch the working fluid input to the second electrochemical module. A polarity of the electric field applied to the first electrochemical module can then be switched to allow regeneration of the input electrode while the second electrochemical module actively performs compression of the working fluid. The system may switch back and forth, redirecting working fluid input between the pair of electrochemical modules, such that one is always performing compression while the other is idle/recharging.

Embodiments of the disclosed electrochemical module are not limited to use in a vapor compression cycle. Rather, the electrochemical module can find use in a wide variety of applications where transport of a fluid through an anion exchange membrane using $O_2$ as carrier gas is possible and desirable. For example, embodiments of the disclosed electrochemical device can be employed in a power generation system, such as an organic Rankine cycle (ORC) or a Brayton cycle, with $CO_2$ as working fluid.

Figure 16A:
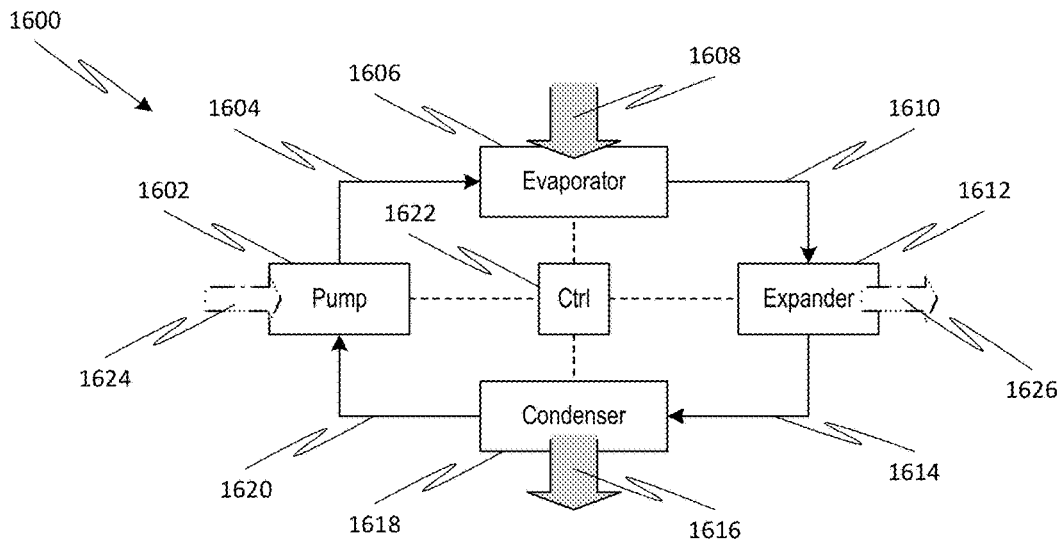
FIG. 16A is a simplified schematic diagram of an organic Rankine cycle where an electrochemical device can be employed as one or more components, according to one or more embodiments of the disclosed subject matter.

For example, FIG. 16A illustrates an exemplary configuration of ORC 1600, which may have a substantially conventional configuration other than the use of the electrochemical device(s). For example, ORC 1600 can have a heat exchanger 1606 operating as evaporator, which transfers heat 1608 to the working fluid circulating therethrough, and a heat exchanger 1618 operating as a condenser, which transfers heat 1616 from the working fluid circulating therethrough. A controller 1622 can be operatively coupled to the different components of the ORC 1600 to control operation and performance of the system, for example, to achieve a desired net power output 1626.

In ORC 1600, the pump 1602 (e.g., a conventional liquid pump or electrochemical device) receives liquid-phase working fluid at 1620 from condensing heat exchanger 1618 and pumps it to a higher pressure at 1604. Heat 1608 is transferred to the pumped working fluid 1604 via heat exchanger 1606 to generate vapor-phase working fluid at 1610. After evaporating heat exchanger 06, the vapor-phase working fluid 1610 is provided to an expansion device 1612 (e.g., a turbine or electrochemical device), which generates power 1626 by expanding the working fluid (a portion of which may be used a power 1624 for pump 1602). Heat 1616 is transferred from the resulting low pressure working fluid 1614 using condensing heat exchanger 1618. The resulting liquid-phase working fluid at 1620 can then be conveyed to pump 1602, where the cycle repeats. Heat 1608 can thus be used to generate a net power output 1626.

Figure 16B:
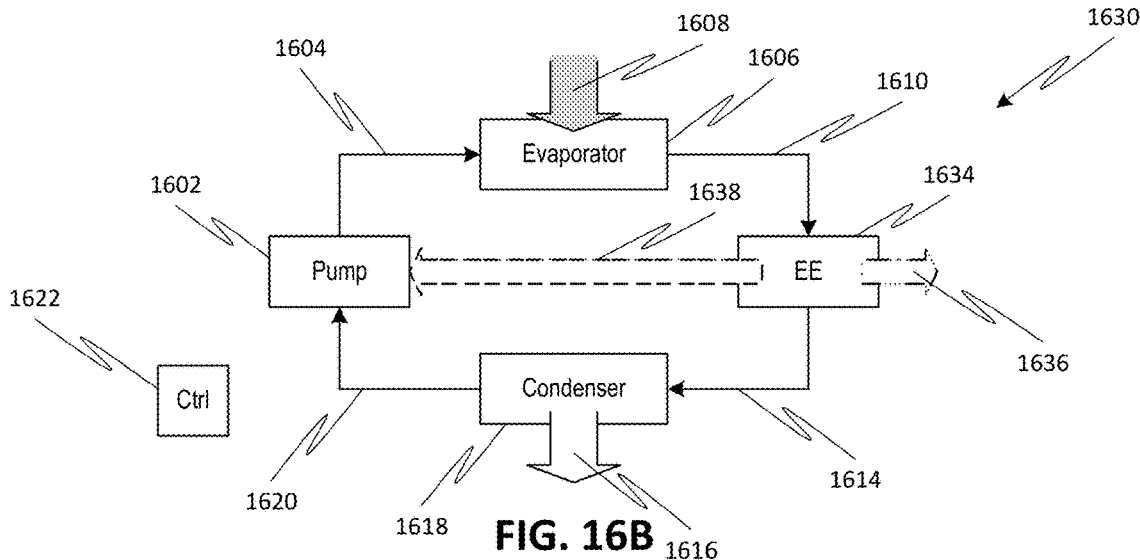
FIG. 16B illustrates an exemplary configuration of the system of FIG. 16A where an electrochemical device is used as expander, according to one or more embodiments of the disclosed subject matter.
Figure 16C:
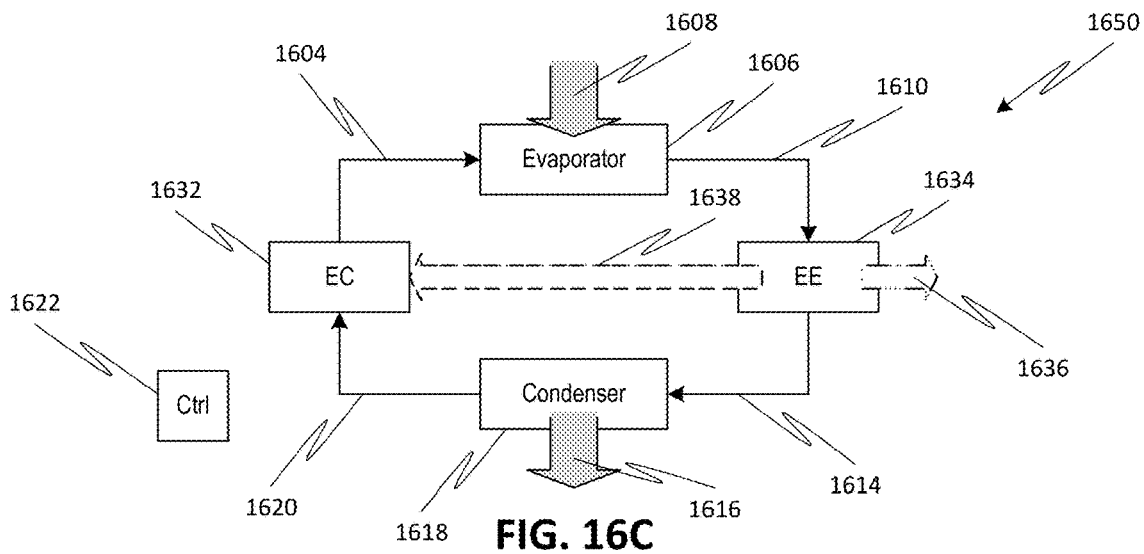
FIG. 16C illustrates an exemplary configuration of the system of FIG. 16A where electrochemical devices are used as pump and expander, respectively, according to one or more embodiments of the disclosed subject matter.

The electrochemical device may be employed as pump 1602 and/or expander 1612 in ORC 1600. For example, FIG. 16B shows ORC 1630 where an electrochemical device 1634 operates as expander. The electrochemical expander 1634 may be similar to the device illustrated in FIG. 1B and described above. Thus, as the working fluid passes through the MEA of the electrochemical expander 1634, electrical power may be harvested and used for powering different components of ORC 1630. For example, at least part 1638 of the harvested electrical power can be used to power pump 1602. The remaining power 1636 (i.e., net power) generated by the electrochemical expansion 1634 can be directed for further processing (e.g., conversion of DC to AC voltage), use, or storage. Alternatively or additionally, the pump 1602 of FIG. 16B can be replaced with an electrochemical device 1632, for example, as shown in ORC 1650 of FIG. 16C. For example, the electrochemical device 1632 may be similar to the device illustrated in FIG. 1A and described above.

Figure 17A:
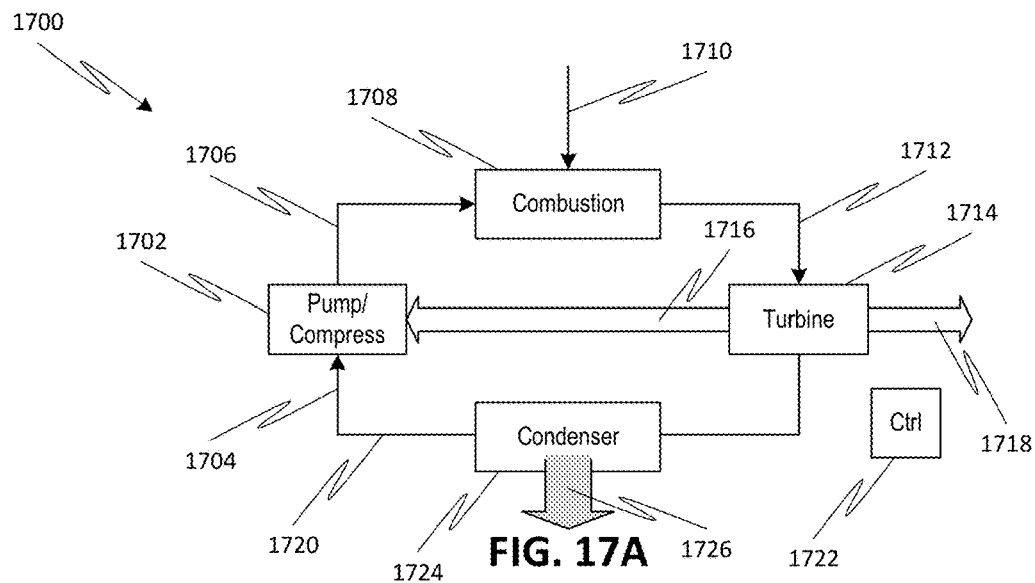
FIG. 17A is a simplified schematic diagram of Brayton cycle where an electrochemical device can be employed as one or more components, according to one or more embodiments of the disclosed subject matter.

FIG. 17A illustrates an exemplary configuration of a Brayton cycle 1700, which may have a substantially conventional configuration other than the use of the electrochemical device(s) and $CO_2$ as working fluid. For example, Brayton cycle 1700 can have a combustion chamber 1708 that receives pressurized working fluid 1706 from a pump or compressor 1702. Fuel 1710 is burned in combustion chamber 1708, which heats the working fluid therein and produces a heated, pressurized working fluid output 1712. The working fluid output 1712 is provided to a turbine or expander 1714, which expands the working fluid to extract useful work or power 1718 therefrom. A portion 1716 of the extracted power can be used to drive pump/compressor 1702. The expanded working fluid 1720 output from the expander 1714 can be rerouted directly back to the pump/compressor 1702 (not shown), or via a heat exchanger 1724 for rejecting heat 1726 from the working fluid 1720. A controller 1722 can be operatively coupled to the different components of the Brayton cycle 1700 to control operation and performance of the system, for example, to achieve a desired net power output 1718.

In other configurations of Brayton cycle 1700, the output 1720 from turbine 1714 can be exhausted to the environment rather than recirculated at 1704 to pump 1702 (i.e., an open Brayton cycle rather than the illustrated closed Brayton cycle). In such configurations, input 1704 may be taken from ambient air, and at least the CO$_2$ in the ambient air input is compressed by pump 1702.

Figure 17B:
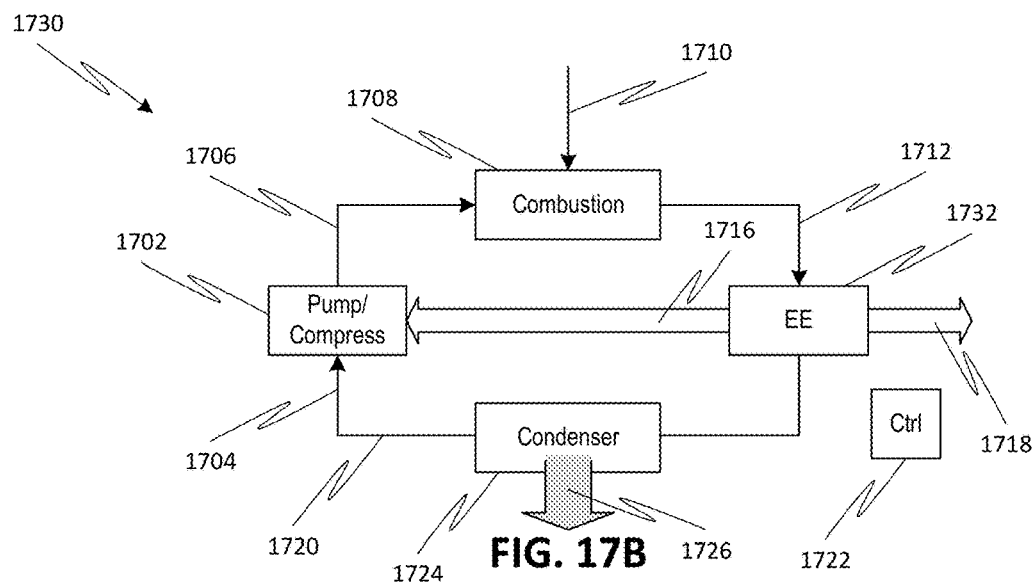
FIG. 17B illustrates an exemplary configuration of the system of FIG. 17A where an electrochemical device is used as expander, according to one or more embodiments of the disclosed subject matter.

The electrochemical device may be employed as pump 1702 and/or expander 1714 in Brayton cycle 1700. For example, FIG. 17B shows Brayton cycle 1730 where an electrochemical device 1732 operates as expander. The electrochemical expander 1732 may be similar to the device illustrated in FIG. 1B and described above. Thus, as the working fluid passes through the MEA of the electrochemical expander 1732, electrical power may be harvested and used for powering different components of Brayton cycle 1730. For example, at least part 1716 of the harvested electrical power can be used to power pump 1702. The remaining power 1718 (i.e., net power) generated by the electrochemical expansion 1732 can be directed for further processing (e.g., conversion of DC to AC voltage), use, or storage.

Figure 17C:
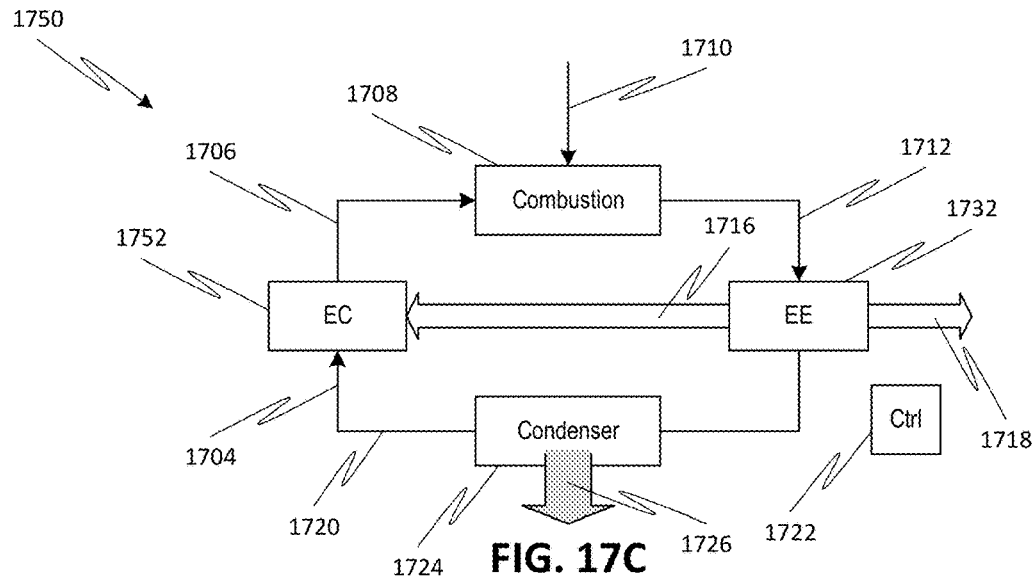
FIG. 17C illustrates an exemplary configuration of the system of FIG. 17A where electrochemical devices are used as pump and expander, respectively, according to one or more embodiments of the disclosed subject matter.

Alternatively or additionally, the pump 1702 of FIG. 17B can be replaced with an electrochemical device 1752, for example, as shown in Brayton cycle 1750 of FIG. 17C. For example, the electrochemical device 1752 may be similar to the device illustrated in FIG. 1A and described above. When used in an open Brayton cycle configuration, electrochemical device 1752 may also serve to isolate CO$_2$ from ambient air in addition to compressing the CO$_2$ for input to combustion chamber 1708.

Although the above description focused on electrochemical processing of a working fluid in a heating/cooling cycle (e.g., vapor compression cycle) or a power generation cycle (e.g., ORC or Brayton cycle), embodiments of the disclosed electrochemical module are not limited to such uses. Rather, the electrochemical module can be applied to transport of a fluid that is not otherwise considered a working fluid.

Figure 9A:
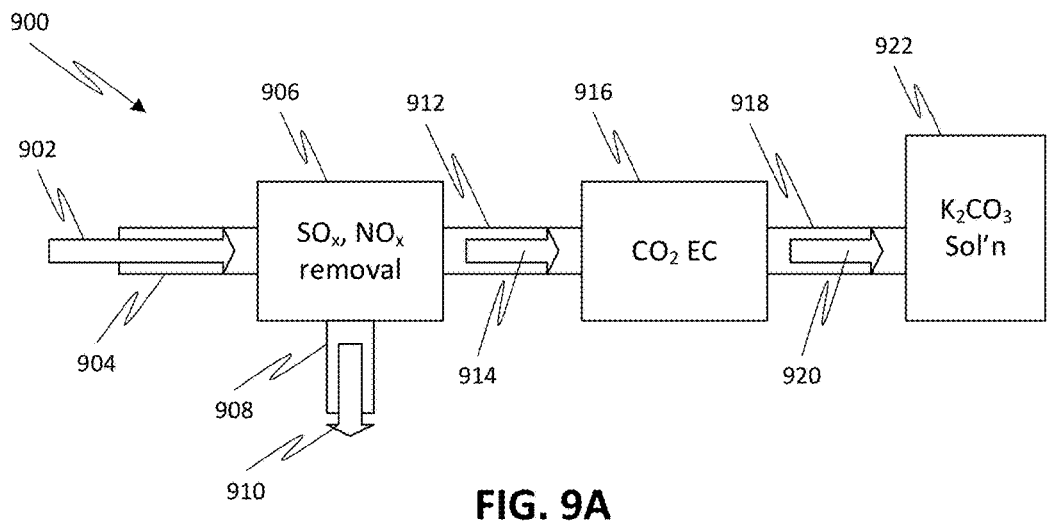
FIG. 9A is a simplified schematic diagram illustrating aspects of electrochemical compression for capture and storage of carbon dioxide from flue gas, according to one or more embodiments of the disclosed subject matter.
Figure 10:
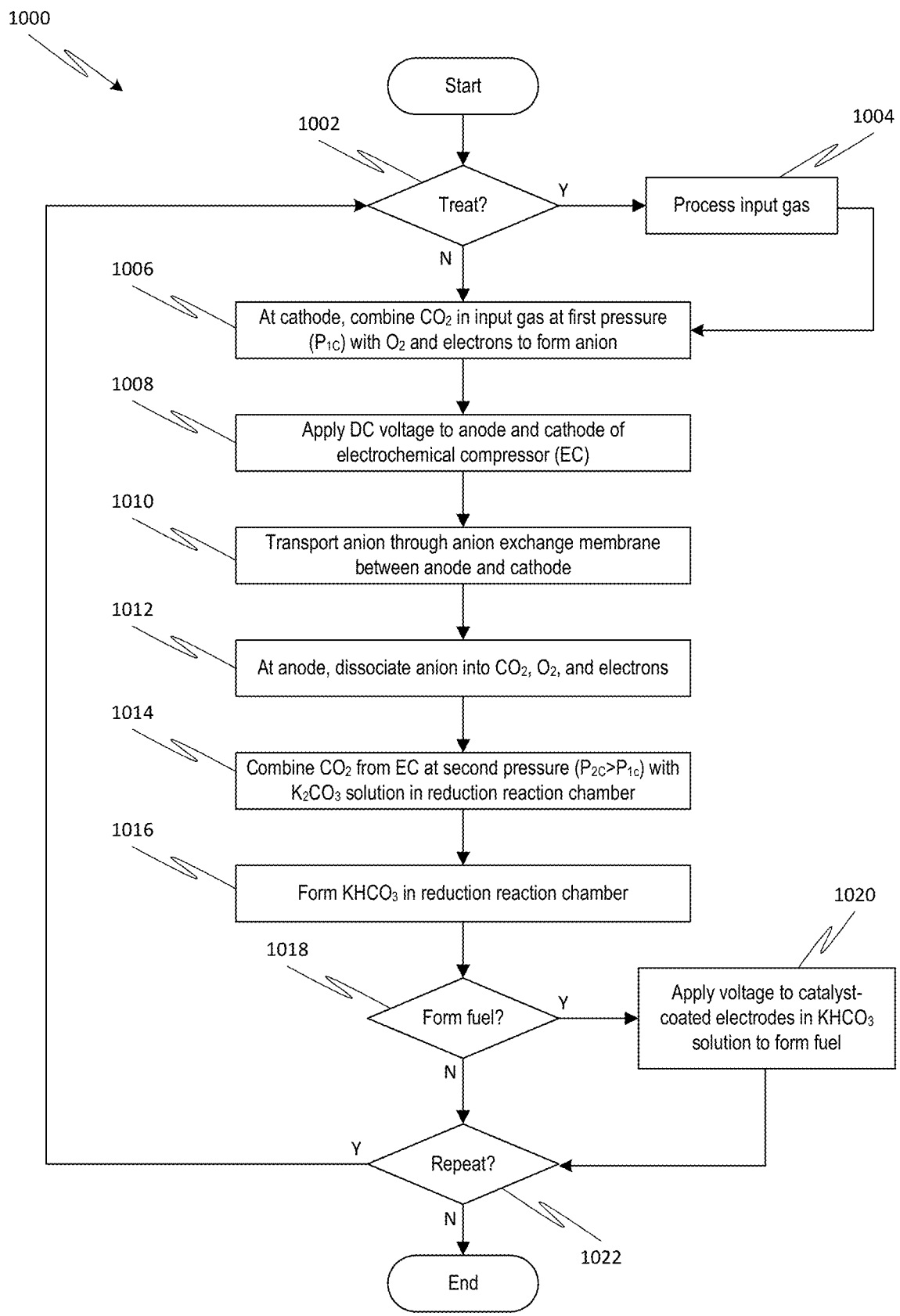
FIG. 10 is an exemplary process flow diagram for capture and storage of carbon dioxide using electrochemical compression, according to one or more embodiments of the disclosed subject matter.

For example, FIGS. 9A and 10 illustrates aspects of a capture system 900 and method 1000, respectively, employing an electrochemical module 916 for removing CO$_2$ from an exhaust gas flow (e.g., flue gas). The electrochemical module 916 may be constructed similar to that described above (e.g., with respect to FIG. 1A) and operated in a similar manner as described above (e.g., with respect to FIG. 7A). Flue gas 902 can be directed to system 900 via an inlet conduit 904. The flue gas can be comprised of CO$_2$, sulfur oxides (SO$_x$), and nitrogen oxides (NO$_x$), among other components. Since the SO$_x$ and NO$_x$ may otherwise damage or poison catalysts of the electrochemical module 916, it can be determined at 1002 whether treatment is necessary to remove these components. If so, the process 1000 proceeds to 1004, where a treatment unit 906 can remove these components (or at least reduce a concentration of these components) from the flue gas 902. The SO$_x$, NO$_x$ waste components 910 can be discharged via outlet 908 while the remaining flue gas 914 can be directed to electrochemical module 916 via inlet conduit 912.

The flue gas 914 may include CO$_2$ at a relatively low pressure (e.g., P$_{1C}$=~0.1-1 atm) and is incident on a cathode of the AEM of the electrochemical module 916. The catalyst of the cathode facilitates a reaction between the CO$_2$ and O$_2$ to form an anion at 1006. At 1008, a DC voltage is applied between the cathode and anode of the AEM of the electrochemical module 916, thereby transporting the anion through the AEM at 1010. The catalyst of the anode facilitates the reverse reaction to dissociate the anion back into CO$_2$ and O$_2$ at 1012. The electrochemical module 916 thus transports the CO$_2$ across its AEM to isolate the CO$_2$ 920 from the inlet flue gas 914. The resulting CO$_2$ 920 may be at a relatively higher pressure (e.g., P$_{2C}$=~1-100 atm, such as 20 atm).

An outlet conduit 918 can direct the relatively higher-pressure CO$_2$ stream 920 for further processing or use. For example, it may desirable to store the CO$_2$ to prevent it from entering the atmosphere or for other purposes. Thus, in some embodiments, process 1000 proceeds to 1014, where outlet conduit 918 directs the CO$_2$ stream 920 to a storage 922.

For example, storage 922 can include a potassium carbonate (K$_2$CO$_3$) solution, which can absorb the CO$_2$ when combined at high pressure. In particular, the absorption process can be given by:

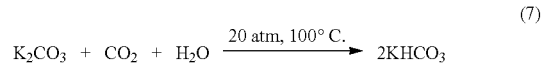

(7)

In general, the flue gas may have a sufficiently high temperature that the CO$_2$ stream 920 does not require separate heating for combination with the K$_2$CO$_3$ solution. However, in some embodiments, 1014 can include heating the CO$_2$ stream 920 to a sufficiently high temperature (e.g., ~100° C.) for the above noted reaction with K$_2$CO$_3$.

Other options for storage 922 are also possible according to one or more contemplated embodiments. For example, storage 922 can include liquefying the captured CO$_2$. The liquefied CO$_2$ can then be injected into the ground, submerged in body of water (e.g., ocean), or sequestered in any other receptacle. In another example, storage 922 can be a receptacle such as a gas tank or cylinder, for example, for use of liquid CO$_2$ in commercial or research purposes.

In some embodiments, the stored CO$_2$ can be further processed to produce fuel, such as ethylene (C$_2$H$_4$) and/or methane (CH$_4$). If it is determined that fuel is desirable at 1018, the process 1000 can proceed to 1020 for fuel production. For example, the fuel production process 1020 can employ the conversion system 960 illustrated in FIG. 9C. The KHCO$_3$ solution 976 from prior or contemporaneous storage can be directed to reaction chamber 962 via an inlet port 978. Electrodes 966, 968, each of which are coated with a respective catalyst 970, 972, are submerged in the KHCO$_3$ solution 974 within reaction chamber 962.

Voltage applied by voltage source 964 to the electrodes 966, 968 causes an electrochemical reduction reaction to take place which generates a fuel stream from the KHCO$_3$ solution. In particular, the reduction reaction can be given by:

(8)

The resulting fuel stream can be conveyed from reaction chamber 962 via an outlet conduit 920 for use or further processing. Returning to FIG. 10, the process 1000 can then proceed to 1022, where it is determined if the process 1000 should be repeated, for example, as part of an ongoing CO$_2$ capture and fuel production cycle, or any other cycle, in which case the process 1000 returns to 1002.

Although 1002-1022 are illustrated separately in FIG. 10, it is contemplated that such process steps may occur contemporaneously, for example, during the continuous operation of a CO$_2$ capture and fuel production cycle. Moreover, the particular order of 1002-1022 in FIG. 10 has been chosen for explanatory purposes only and is not intended to be limiting. Indeed, in practical embodiments of the disclosed subject matter, the illustrated steps may occur before or during other steps. For example, the electric field application of 1008 may occur before or during the forming the anion of 1006.

Figure 9B:
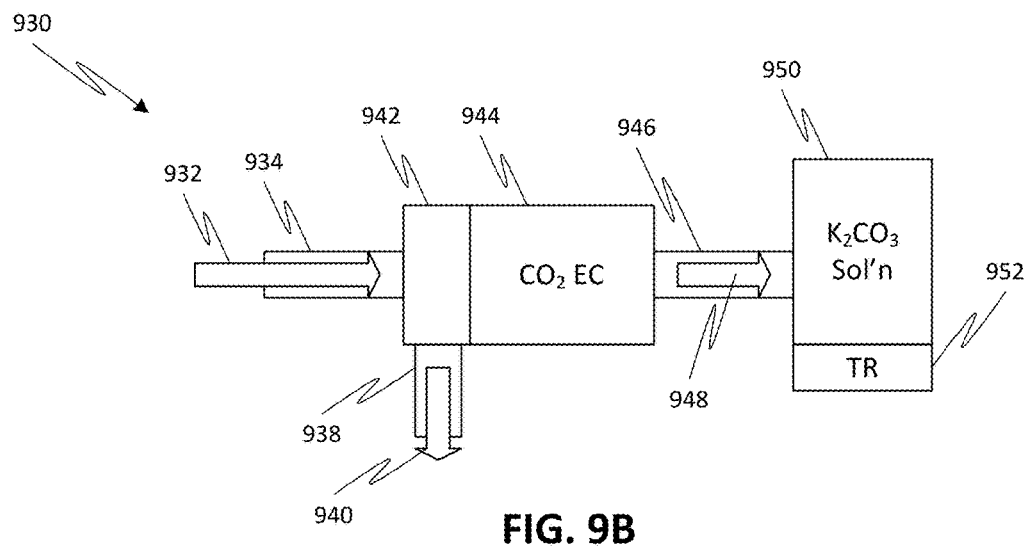
FIG. 9B is a simplified schematic diagram illustrating aspects of electrochemical compression for capture and storage of carbon dioxide from air, according to one or more embodiments of the disclosed subject matter.
Figure 9C:
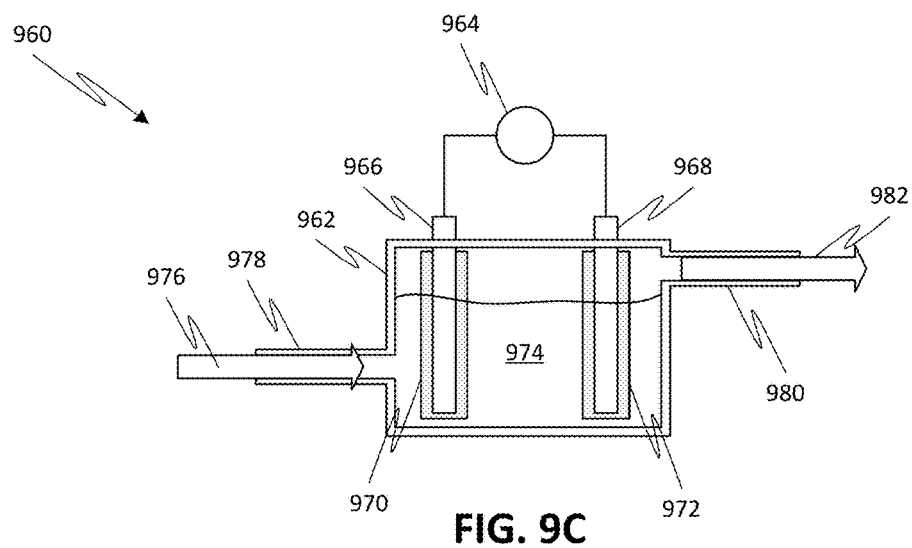
FIG. 9C is a simplified schematic diagram illustrating aspect of conversion of captured carbon dioxide to fuel, according to one or more embodiments of the disclosed subject matter.

Although the description of FIGS. 9A and 10 have discussed the capture of $CO_2$ from flue gas, embodiments of the disclosed subject matter are not limited thereto. Rather, $CO_2$ can be captured from other sources according to one or more contemplated embodiments. For example, FIG. 9B illustrates a capture system 930 for capturing $CO_2$ from ambient air 932. Inlet conduit 934 directs the ambient air 932 to an inlet manifold 942 of electrochemical compressor 944, where the $CO_2$ is transported from the ambient air 932 across the AEM of the electrochemical compressor 944. The remaining $CO_2$-depleted air 940 can be exhausted from inlet manifold 942 via outlet conduit 938, while the captured $CO_2$ is transported via conduit 948 for storage in $K_2CO_3$ solution (as described above) or to any other storage, or directed to a waste outlet. Since the temperature of the ambient air may be insufficient to support the chemical reaction between $CO_2$ and $K_2CO_3$, a separate thermal regulation unit 952 can be provided to heat the solution 950 and/or the captured $CO_2$ stream 948 to an elevated temperature (e.g., 100° C.).

Figure 11:
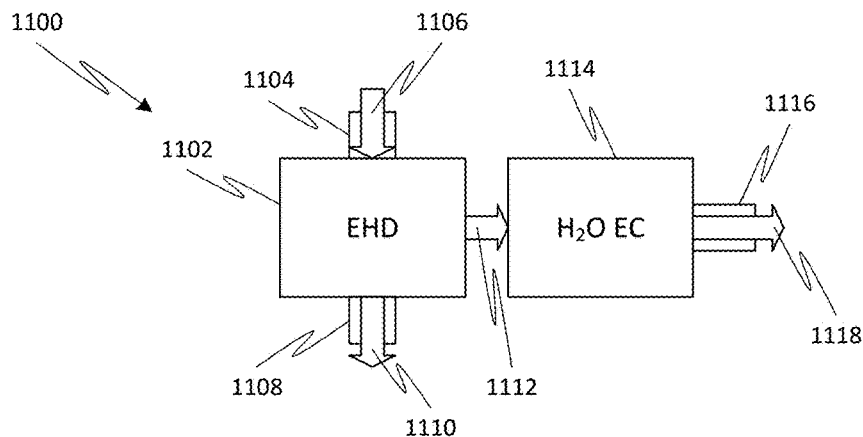
FIG. 11 is a simplified schematic diagram illustrating aspects of electrochemical dehumidification, according to one or more embodiments of the disclosed subject matter.
Figure 15:
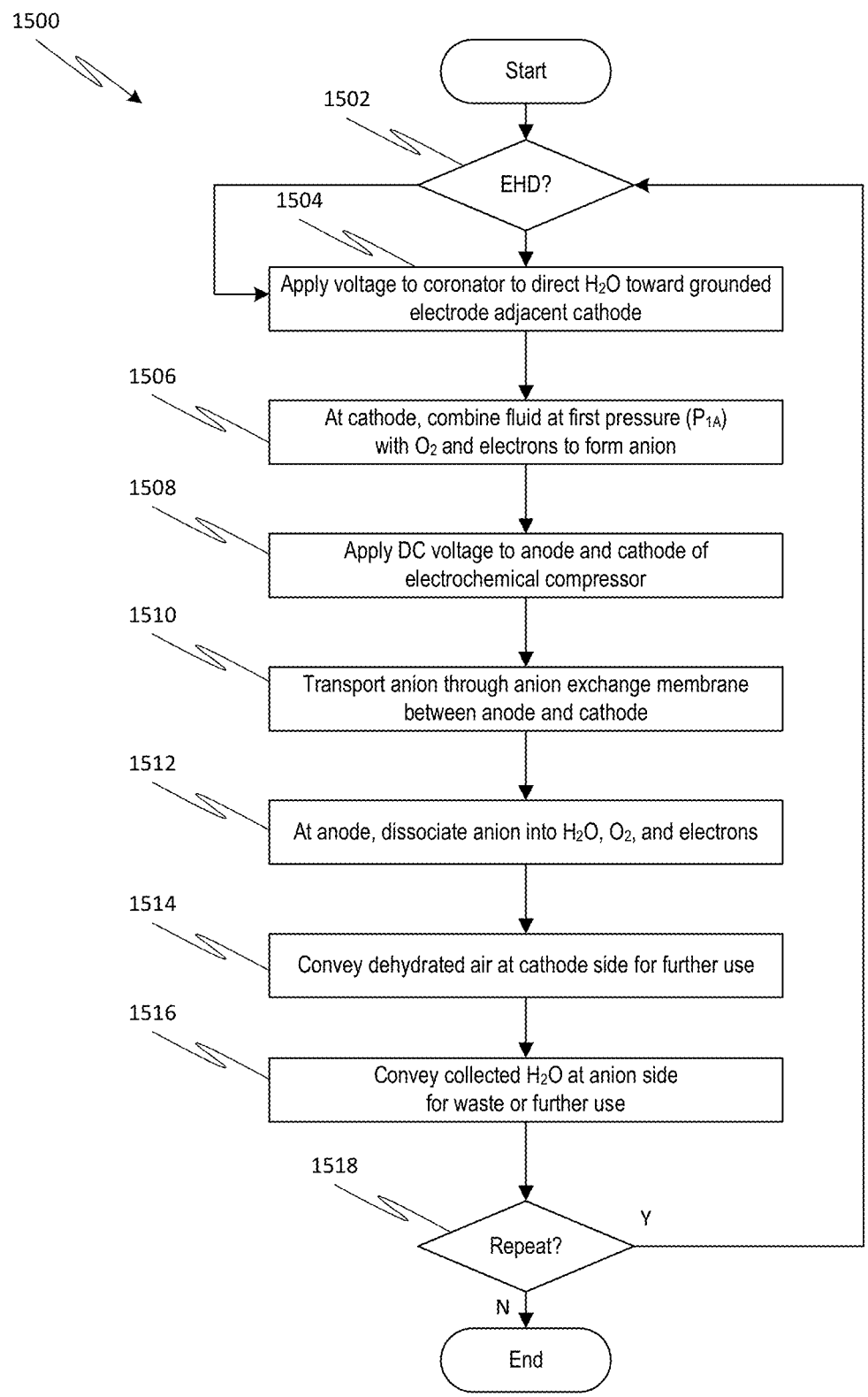
FIG. 15 is an exemplary process flow diagram for electrochemical dehydration using oxygen as carrier gas, according to one or more embodiments of the disclosed subject matter.

Although the above description has focused on the transport of $CO_2$, embodiments of the disclosed subject matter are not limited thereto. Rather, the electrochemical module can be applied to other fluids. Indeed, any fluid capable of a catalyst-driven reaction with $O_2$ gas to form an anion can be transported using the disclosed electrochemical devices. For example, in some embodiments, the electrochemical device can be sued to capture water vapor from air (i.e., dehumidifier). FIGS. 11 and 15 illustrate aspects of a dehumidifying system 1100 and method 1500, respectively, employing an electrochemical module 1114 for removing $H_2O$ from air 1106 (e.g., ambient air). The electrochemical module 1114 may be constructed similar to that described above (e.g., with respect to FIG. 1A) and operated in a similar manner as described above (e.g., with respect to FIG. 7A).

Air 1106 having a first humidity level can be directed to system 1100 via an inlet conduit 1104. In some embodiments, it may be desirable to increase efficiency of water vapor transfer by employing an electrohydrodynamic (EHD) module 1102 to direct water vapor in the air toward the AEM. For example, EHD module 1102 can include a coronator electrode, to which a high voltage is applied, and an electrode (e.g., mesh electrode), which is separate from but adjacent to the cathode of the AEM and which is held at ground.

Figure 12A:
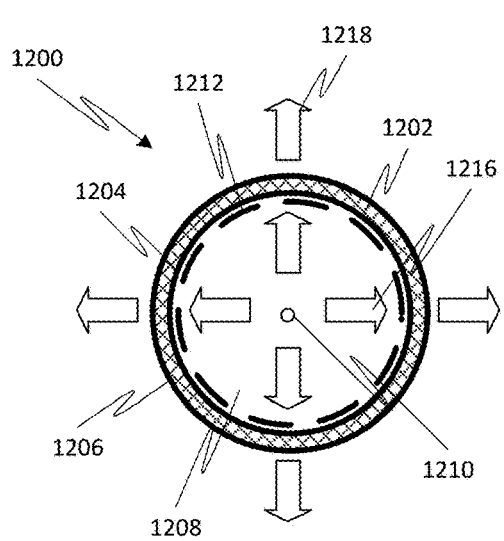
FIGS. 12A-12B are cross-sectional views of an exemplary electrochemical dehumidification device having a cylindrical arrangement, according to one or more embodiments of the disclosed subject matter.
Figure 12B:
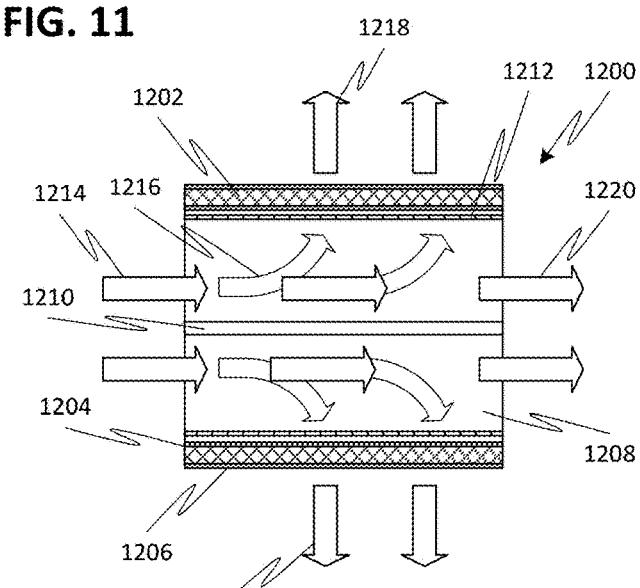

In some embodiments, the EHD module 1102 may be integrated with the electrochemical module 1114, for example, as part of the inlet flow path to or inlet manifold of the electrochemical module 1114. For example, FIGS. 12A-12B illustrate an EHD module combined with an electrochemical module to form a dehydration unit 1200 having a substantially cylindrical configuration. The dehydration unit 1200 has a cylindrical AEM 1202 disposed between cylindrical cathode 1204 and cylindrical anode 1206. The cathode 1204 defines an inner volume 1208 to which an input air flow 1214 can be provided, while anode 1206 defines an exterior volume to which the captured humidity 1218 can be exhausted. Thus, humidified air 1214 can enter the unit 1200 at one end and can leave the unit 1200 at the other end as dehumidified air 1220. A coronator electrode 1210 is disposed at a center of the interior volume 1208 and is substantially equidistant from a grounded mesh electrode 1212, which is disposed adjacent to but separate from cathode 1204. The electric field generated between the coronator 1210 and the grounded mesh 1212 drives water vapor 1216 in the air flow 1214 toward the cathode 1204 so as to be incident thereon for the desired catalytic reaction with $O_2$.

Figure 12C:
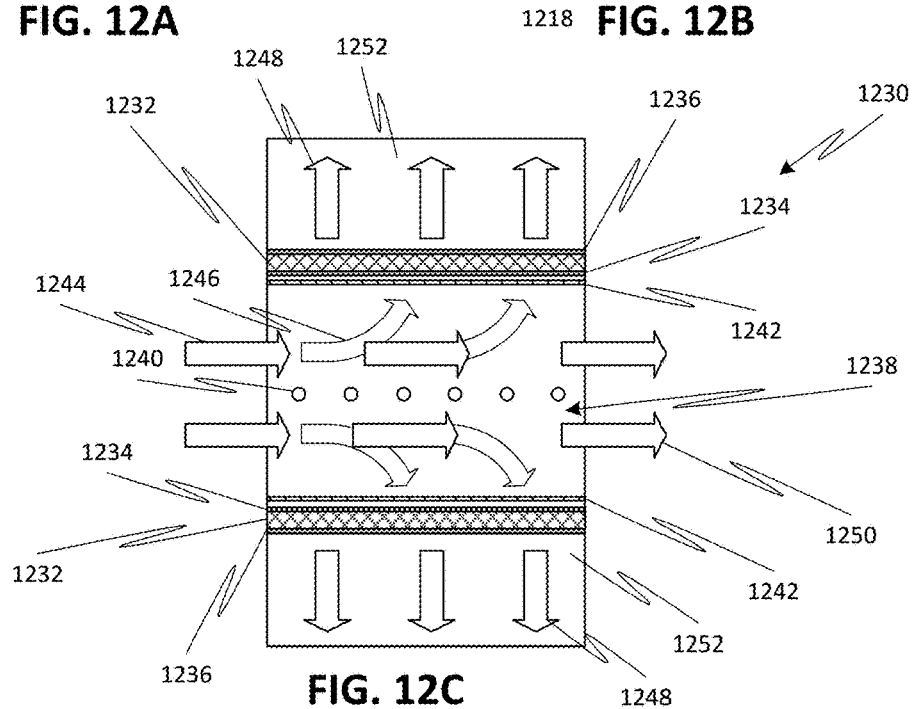
FIG. 12C is a cross-sectional view of an exemplary electrochemical dehumidification device having a planar arrangement, according to one or more embodiments of the disclosed subject matter.

FIG. 12C illustrates an EHD module combined with an electrochemical module to form another dehydration unit 1230 having a substantially planar configuration. The dehydration unit 1230 has a pair of planar AEMs 1232 separated by an inner volume 1238. Each AEM 1232 has a respective cathode 1234 disposed on the inner volume 1238 side and a respective anode 1236 disposed on a side of the AEM 1232 opposite the inner volume 1238. Input air flow 1244 is provided to the inner volume 1238, while captured humidity 1248 is provided to exhaust chamber 1252, which may be an enclosed conduit with its own air flow (e.g., perpendicular to a direction of flow 1244) to clear the captured water 1248 or an ambient environment (e.g., outdoor from a conditioned space). Thus, humidified air 1244 can enter unit 1230 at one end and can leave the unit 1230 at the other end as dehumidified air 1250. One or more coronator electrodes 1240 can be disposed along a centerline of the interior volume 1238 and are substantially equidistant from grounded mesh electrodes 1242 on either side. Again, the mesh electrodes 1242 are adjacent to but separate from the cathodes 1234. The electric field generated between each coronator 1240 and each grounded mesh 1242 drives water vapor 1246 in the air flow 1244 toward respective cathodes 1234 so as to be incident thereon for the desired catalytic reaction with $O_2$.

Of course, other geometries other than those specifically illustrated in FIGS. 12A-12C are also possible according to one or more contemplated embodiments. Moreover, although a single unit is illustrated in FIGS. 12A-12C, it is contemplated that an array of such units could be provided in order to provide greater dehumidification capacity.

Returning to FIGS. 11 and 15, at 1502, it can be determined whether EHD is desired. If so, the process 1500 proceeds to 1504, where a voltage is applied to the coronator electrode, and the resulting electric field drives water vapor 1112 in the air flow 1106 toward the AEM of the electrochemical device 1114 so that it is incident on the cathode thereof. The air 1104 may include $H_2O$ at a relatively low pressure (e.g., $P_{1a}=1$ atm). The catalyst of the cathode facilitates a reaction between the $H_2O$ and $O_2$ to form an anion at 1506. At 1508, a DC voltage is applied between the cathode and anode of the AEM of the electrochemical module 1114, thereby transporting the anion through the AEM at 1510. The catalyst of the anode facilitates the reverse reaction to dissociate the anion back into $H_2O$ and $O_2$ at 1512.

The electrochemical module 1114 thus transports the $H_2O$ across its AEM to isolate the $H_2O$ 1118 (which may now be at a relatively higher pressure) from the inlet air 1106. At 1514, the resulting dehydrated air 1110 can be conveyed from system 1100 by outlet conduit 1108, for example, to a conditioned space. Meanwhile, at 1516, an outlet conduit 1116 can direct the relatively higher-pressure $H_2O$ stream 1118 for further processing or use. For example, it may desirable to condense the water vapor to produce drinking or reclaimed water. Alternatively or additionally, the collected water vapor 1118 can be exhausted to atmosphere, stored for later, or condensed and disposed of. The process 1500 can then proceed to 1518, where it is determined if the process 1500 should be repeated, for example, as part of an ongoing dehumidification cycle, or any other cycle, in which case the process 1500 returns to 1502.

Although 1502-1518 are illustrated separately in FIG. 15, it is contemplated that such process steps may occur contemporaneously, for example, during the continuous operation of a dehumidification cycle. Moreover, the particular order of 1502-1518 in FIG. 15 has been chosen for explanatory purposes only and is not intended to be limiting. Indeed, in practical embodiments of the disclosed subject matter, the illustrated steps may occur before or during other steps. For example, the electric field application of 1508 may occur before or during the forming the anion of 1506.

The electrochemical dehydration units (with or without integrated electrohydrodynamic unit) described above can be combined with a conventional heating/cooling/refrigeration (HCR) system (e.g., a vapor compression system) to improve cooling performance of the system. The combined electrochemical dehydration unit and HCR system may operate as a separate sensible and latent cooling (SSLC) system. The HCR system is thus configured to handle the sensible cooling while the electrochemical dehydration unit is configured to handle latent cooling (i.e., dehumidification) . In the HCR system, the evaporator can be operated at a temperature higher than the dew point of the return air so that it handles the sensible load only. This results in a reduced temperature lift for the HCR system and a lower compressor power input, thereby improving the coefficient of performance (COP).

Figure 13:
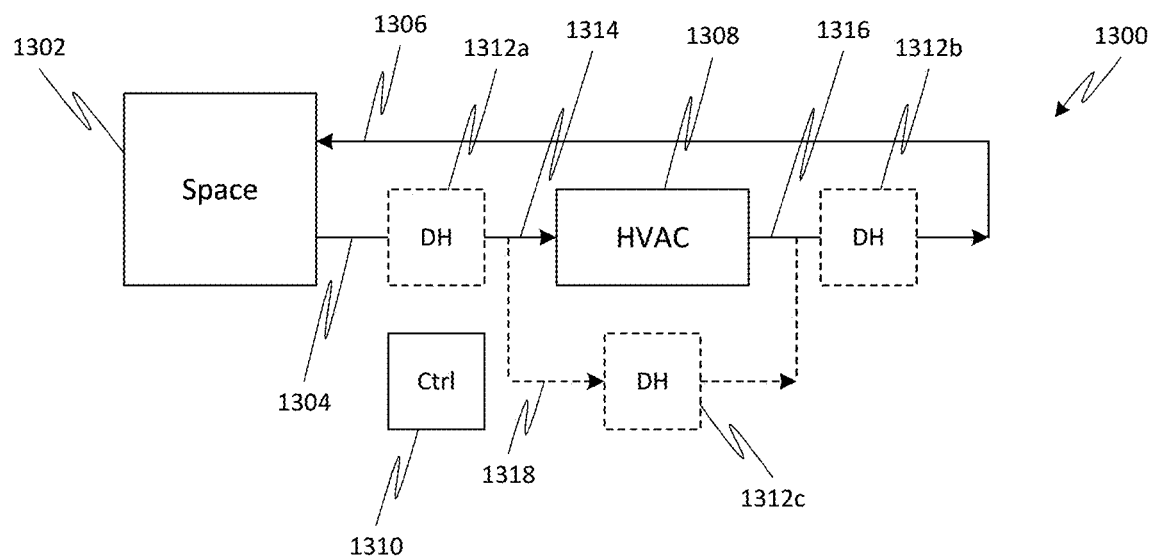
FIG. 13 is a simplified schematic diagram illustrating aspects of a space conditioning system incorporating electrochemical dehumidification, according to one or more embodiments of the disclosed subject matter.

For example, FIG. 13 illustrates aspects of a system 1300 combining electrochemical dehydration 1312 and HCR 1308 units for conditioning space 1302. The dehydration unit 1312c may operate in parallel with the HCR system 1308. For example, a first portion 1314 (e.g., ¾) of the return air 1304 from a conditioned space 1302 can be processed using the HCR system 1308, while the remainder 1318 (e.g., ¼) bypasses the HCR system 1308 and is processed by the electrochemical dehydration unit 1312c. Alternatively or additionally, dehydration unit 1312a may treat an input to the HCR system 1308, and/or dehydration unit 1312b can treat output 1316 from the HCR system 1308. The output air flow from each of the dehydration and HCR units can be combined at 1306 for conditioning space 1302. A common control unit 1310 can be provided to control operation of the HCR system 1302 and the dehydration unit 1312a-c, for example, to provide a desired temperature or thermal comfort level to the conditioned space 1302

Figure 14:
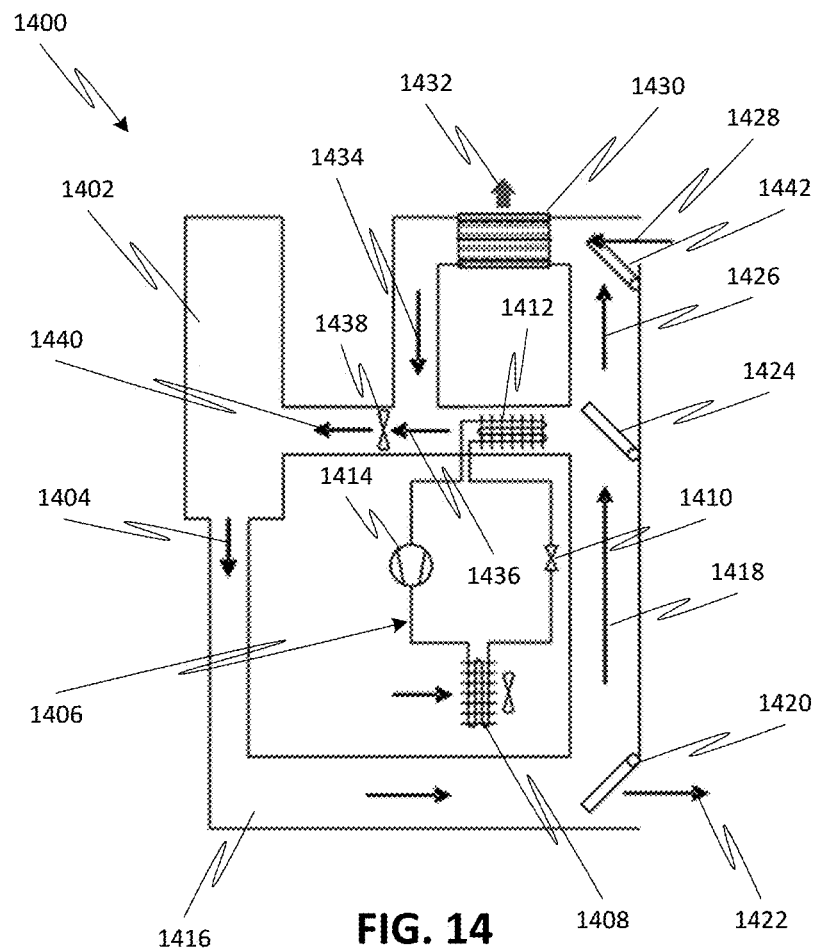
FIG. 14 is a simplified system layout of an exemplary space conditioning system with bypass electrochemical dehumidification unit, according to one or more embodiments of the disclosed subject matter.

FIG. 14 illustrates an exemplary layout 1400 of an SSLC system employing electrochemical dehydration. The HCR unit 1406 of the SSLC system includes a compressor 1414, a condenser 1408, an expansion valve 1410, and an evaporator 1412, and may operate as a vapor compression system (e.g., the vapor compression system described with respect to FIGS. 5A-6G or a conventional vapor compression system). Return air 1404 from the conditioned space 1402 is conveyed to the HCR system 1406 via an inlet duct 1416. Prior to the HCR system 1406, a first damper 1420 can be provided in the inlet duct 1416 in order to exhaust a portion 1422 to the external environment (e.g., for ventilation or air refreshing purposes). A second damper 1424 can also be provided in the flow path prior to the HCR system 1406 in order to direct a portion 1426 of the remaining return air 1418 to the electrochemical dehumidification unit 1430. A third damper 1442 can be provided in the flow path between the second damper 1424 and the electrochemical dehumidification unit 1430 in order to allow outside air 1428 to enter (e.g., for ventilation or air refreshing purposes).

Thus, the HCR system 1406 can cool a first portion of return air by rejecting heat therein to working fluid flowing through evaporator 1412. Simultaneously, the electrochemical dehydration unit 1430 removes water vapor 1432 from the remaining portion 1426 of return air and any added outdoor air 1428, thereby providing latent cooling. The resulting dehumidified air 1434 can be combined with the cooled air 1436 from the HCR system 1406. A fan 1438 can direct the combined air 1440 to the space 1402 to provide thermal conditioning thereof.

Of course one of ordinary skill in the art will readily appreciate that the layout of FIG. 14 is exemplary only and that other layouts are possible. Indeed, FIG. 14 represents the configuration with dehumidification unit in location 1312c of FIG. 13. Alternative embodiments can reposition at the locations of 1312a and/or 1312b in FIG. 13.

Although particular systems or cycles, in which the disclosed electrochemical device can be used to provide transport, pumping, compression, expansion, or power harvesting have been described, embodiments of the disclosed subject matter are not limited thereto. Indeed, one of ordinary skill in the applicable arts will readily appreciate that the disclosed electrochemical devices can be provide transport, pumping, compression, expansion, or power harvesting in other systems employing beyond those specifically discussed herein.

Moreover, aspects of the above described systems or cycles can be applied in isolation from other aspects thereof. For example, the electrochemical device may be used as a pump of fluid, whether or not part of a heating/cooling or power generation system. For example, the electrochemical device could be used to regenerate stale air (which may have a relatively high $CO_2$ content) by transporting $CO_2$ and/or humidity from input air across the AEM using $O_2$ as carrier gas.

In addition, although particular configurations have been separately discussed above, the features of one particular configuration may apply to other configurations as well. For example, although FIGS. 5A-5C, 6A-6G, and 16A-17C do not specifically illustrate humidity sources (e.g., source 540 in FIGS. 5D-5E) for the electrochemical devices, such configurations can include humidity sources in a manner similar to that illustrated in FIGS. 5D-5E. Similarly, although FIGS. 6D-6G and 16A-17C do not specifically illustrate thermal regulation devices (e.g., device 536 in FIGS. 5B-5E) for the electrochemical devices, such configurations can include thermal regulation devices in a manner similar to that illustrated in FIGS. 5B-5E.

Moreover, although examples involving the separate electrochemical transport of $CO_2$ and $H_2O$ have been discussed above, embodiments of the disclosed subject matter are not limited thereto. For example, in some embodiments, both $CO_2$ and $H_2O$ (along with $O_2$ carrier gas) may be simultaneously transported through AEM. In other embodiments, the material of the AEM and/or the catalyst of the electrodes can be chosen to preferentially select one of $CO_2$ and $H_2O$ for transport through the AEM. For example, $CO_2$ may be selected over $H_2O$ for transport by using a solid oxide membrane and operating at a relatively high temperature to form $CO_3^-$. In addition, the compounds that can be transported through the AEM are not limited $CO_2$ and $H_2O$. Rather any compound capable combining with $O_2$ carrier gas or OH to form an anion can be transported by the disclosed electrochemical devices.

Although the description above has used the terms "fluid" and "working fluid," it will be readily apparent to one of ordinary skill in the applicable arts that such terminology includes the vapor and supercritical phases as well as the liquid phase. Indeed, in some embodiments, the electrochemical device may receive a two-phase input (e.g., liquid-phase and vapor-phase $CO_2$) and transport the input fluid across the AEM. Depending on temperature and pressure, the transported fluid may remain multi-phase or may become a single phase. In other embodiments, the electrochemical device may receive a liquid-phase only input, and thus may operate as a pump to transport the liquid-phase across the AEM. In still other embodiments, the fluid (e.g., $CO_2$) input to the electrochemical device may be a supercritical fluid, which may be compressed and cooled during the compression process by the electrochemical device.

Moreover, although exemplary chemistries and materials have been discussed above, one of ordinary skill in the art will understand that the teachings of the present disclosure can be extended to other materials and chemistries. Thus, embodiments of the disclosed subject matter are not limited to the specific chemistries and materials discussed herein.

It will be appreciated that the aspects of the disclosed subject matter can be implemented, fully or partially, in hardware, hardware programmed by software, software instruction stored on a computer readable medium (e.g., a non-transitory computer readable medium), or any combination of the above.

For example, components of the disclosed subject matter, including components such as a controller, process, or any other feature, can include, but are not limited to, a personal computer or workstation or other such computing system that includes a processor, microprocessor, microcontroller device, or is comprised of control logic including integrated circuits such as, for example, an application specific integrated circuit (ASIC).

Features discussed herein can be performed on a single or distributed processor (single and/or multi-core), by components distributed across multiple computers or systems, or by components co-located in a single processor or system. For example, aspects of the disclosed subject matter can be implemented via a programmed general purpose computer, an integrated circuit device, (e.g., ASIC), a digital signal processor (DSP), an electronic device programmed with microcode (e.g., a microprocessor or microcontroller), a hard-wired electronic or logic circuit, a programmable logic circuit (e.g., programmable logic device (PLD), programmable logic array (PLA), field-programmable gate array (FPGA), programmable array logic (PAL)), software stored on a computer-readable medium or signal, an optical computing device, a networked system of electronic and/or optical devices, a special purpose computing device, a semiconductor chip, a software module or object stored on a computer-readable medium or signal.

When implemented in software, functions may be stored on or transmitted over as one or more instructions or code on a computer-readable medium. The steps of a method or algorithm disclosed herein may be embodied in a processor-executable software module, which may reside on a computer-readable medium. Instructions can be compiled from source code instructions provided in accordance with a programming language. The sequence of programmed instructions and data associated therewith can be stored in a computer-readable medium (e.g., a non-transitory computer readable medium), such as a computer memory or storage device, which can be any suitable memory apparatus, such as, but not limited to read-only memory (ROM), programmable read-only memory (PROM), electrically erasable programmable read-only memory (EEPROM), random-access memory (RAM), flash memory, disk drive, etc.

As used herein, computer-readable media includes both computer storage media and communication media, including any medium that facilitates transfer of a computer program from one place to another. Thus, a storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a transmission medium (e.g., coaxial cable, fiber optic cable, twisted pair, digital subscriber line (DSL), or wireless technologies such as infrared, radio, and microwave), then the transmission medium is included in the definition of computer-readable medium. Moreover, the operations of a method or algorithm may reside as one of (or any combination of) or a set of codes and/or instructions on a machine readable medium and/or computer-readable medium, which may be incorporated into a computer program product.

One of ordinary skill in the art will readily appreciate that the above description is not exhaustive, and that aspects of the disclosed subject matter may be implemented other than as specifically disclosed above. Indeed, embodiments of the disclosed subject matter can be implemented in hardware and/or software using any known or later developed systems, structures, devices, and/or software by those of ordinary skill in the applicable art from the functional description provided herein.

In this application, unless specifically stated otherwise, the use of the singular includes the plural, and the separate use of "or" and "and" includes the other, i.e., "and/or." Furthermore, use of the terms "including" or "having," as well as other forms such as "includes," "included," "has," or "had," are intended to have the same effect as "comprising" and thus should not be understood as limiting.

Any range described herein will be understood to include the endpoints and all values between the endpoints. Whenever "substantially," "approximately," "essentially," "near," or similar language is used in combination with a specific value, variations up to and including 10% of that value are intended, unless explicitly stated otherwise.

The terms "system," "device," and "module" have been used interchangeably herein, and the use of one term in the description of an embodiment does not preclude the application of the other terms to that embodiment or any other embodiment.

It is thus apparent that there is provided, in accordance with the present disclosure, systems, devices, and methods employing electrochemical processing with oxygen as carrier gas. Many alternatives, modifications, and variations are enabled by the present disclosure. While specific examples have been shown and described in detail to illustrate the application of the principles of the present invention, it will be understood that the invention may be embodied otherwise without departing from such principles. For example, disclosed features may be combined, rearranged, omitted, etc. to produce additional embodiments, while certain disclosed features may sometimes be used to advantage without a corresponding use of other features. Accordingly, Applicant intends to embrace all such alternative, modifications, equivalents, and variations that are within the spirit and scope of the present invention.

The invention claimed is:

1. A system comprising:
an electrochemical module having:
an anion exchange membrane;
a first electrode on an inlet side of the anion exchange membrane, the first electrode operating as a cathode; and
a second electrode on an outlet side of the anion exchange membrane, the outlet side being opposite to the inlet side, the second electrode operating as an anode,
wherein the electrochemical module is constructed to transport a fluid from the inlet side to the outlet side of the anion exchange membrane, in the presence of an electric field applied between the first and second electrodes,
wherein a gas inlet manifold with a first channel configuration is disposed on the inlet side of the anion exchange membrane, a gas outlet manifold with a second channel configuration is disposed on the outlet side of the anion exchange membrane, and the first channel configuration has a different geometry and/or layout from that of the second channel configuration,
wherein the fluid is a compound that reacts with a carrier gas and electrons to form an anion,
wherein the carrier gas is $O_2$,
wherein each of the first and second electrodes comprises a catalyst,
wherein the catalyst of the first electrode is constructed to catalyze a reaction of the fluid with the carrier gas and the electrons to form the anion at the inlet side,
wherein the anion is transported through the anion exchange membrane via the applied electric field,
wherein the catalyst of the second electrode is constructed to catalyze dissociation of the anion at the outlet side to re-form the fluid, the carrier gas, and the electrons, and
wherein the electrochemical module is configured as an electrochemical compressor, and the fluid at the outlet side is at a pressure higher than that of the fluid at the inlet side.

2. The system of claim 1, wherein the fluid is $CO_2$, and the anion is $CO_3^{2-}$.

3. The system of claim 1, wherein the fluid is $H_2O$, and the anion is $OH^-$.

4. The system of claim 1, wherein the catalyst of the first electrode or the catalyst of the second electrode comprises $CaRuO_3$.

5. The system of claim 1, further comprising one or more additional electrochemical modules connected in series with the electrochemical module, wherein each of the one or more additional electrochemical modules has a configuration that is the same as that of the electrochemical module.

6. The system of claim 1, wherein:
the first channel configuration comprises a serpentine channel extending from an inlet of the gas inlet manifold;
a cross-sectional area of the serpentine channel decreases in height, width, or both, with respect to increasing distance from the inlet;
the second channel configuration comprises an array of parallel channels and a collection channel connecting ends of the parallel channels to an outlet of the gas outlet manifold;
a cross-sectional area of the collection channel decreases in height, width, or both, with respect to increasing distance from the outlet; and
a cross-sectional area of each parallel channel is constant.

7. The system of claim 1, wherein the anion is transported through the anion exchange membrane by ion hopping driven by the applied electric field.

8. The system of claim 7, wherein the anion is transported by hopping between carbonate functional groups in the anion exchange membrane.

9. The system of claim 1, wherein each of the first and second electrodes comprises an oxygen-absorbing material constructed to store the carrier gas.

10. The system of claim 9, wherein the oxygen-absorbing material comprises $LaMnO_3$ perovskite.

11. A system comprising:
an electrochemical module having:
an anion exchange membrane;
a first electrode on an inlet side of the anion exchange membrane; and
a second electrode on an outlet side of the anion exchange membrane, the outlet side being opposite to the inlet side;
a heating, cooling, or refrigeration (HCR) system for cooling air of a space; and
an electrohydrodynamic module configured to direct $H_2O$ toward the inlet side of the anion exchange membrane,
wherein the electrochemical module is configured to dehumidify air of said space,
wherein the electrochemical module is constructed to transport a fluid from the inlet side to the outlet side of the anion exchange membrane, in the presence of an electric field applied between the first and second electrodes,
wherein the fluid is a compound that reacts with a carrier gas and electrons to form an anion,
wherein the carrier gas is $O_2$,
wherein each of the first and second electrodes comprises a catalyst,
wherein the catalyst of the first electrode is constructed to catalyze a reaction of the fluid with the carrier gas and the electrons to form the anion at the inlet side,
wherein the anion is transported through the anion exchange membrane via the applied electric field,
wherein the catalyst of the second electrode is constructed to catalyze dissociation of the anion at the outlet side to re-form the fluid, the carrier gas, and the electrons, and
wherein the electrochemical module is configured as an electrochemical compressor, and the fluid at the outlet side is at a pressure higher than that of the fluid at the inlet side.

12. The system of claim 11, wherein the electrohydrodynamic module comprises:
a grounded mesh disposed adjacent the first electrode of the electrochemical module; and
a third electrode disposed within a flow of the $H_2O$ and held at a voltage with respect to the grounded mesh.

13. The system of claim 1, further comprising a heating, cooling, or refrigeration (HCR) system for cooling air of a space, wherein the electrochemical module is configured to dehumidify air of said space.

14. The system of claim 13, wherein a first portion of inlet air is directed to the HCR system for cooling and a second portion of the inlet air is directed to the electrochemical module for dehumidification, such that the HCR system and the electrochemical module operate in parallel.

15. The system of claim 13, wherein an output of one of the HCR system and the electrochemical module is coupled to an inlet of the other of the HCR system and the electrochemical module, such that the HCR and the electrochemical module operate in series.

16. A method comprising:
(a) applying an electric field between first and second electrodes, the first electrode being on an inlet side of an anion exchange membrane of an electrochemical module and operating as a cathode, the second electrode being on an outlet side of the anion exchange membrane and operating as an anode, the outlet side being opposite to the inlet side, each of the first and second electrodes comprising a catalyst;
(b) at the inlet side of the anion exchange membrane and catalyzed by the catalyst of the first electrode, reacting a fluid with a carrier gas and electrons to form an anion;
(c) in the presence of the applied electric field, transporting the anion through the anion exchange membrane to the outlet side; and
(d) at the outlet side of the anion exchange membrane and catalyzed by the catalyst of the second electrode, dissociating the anion to re-form the fluid, the carrier gas, and the electrons,
wherein a gas inlet manifold with a first channel configuration is disposed on the inlet side of the anion exchange membrane, a gas outlet manifold with a second channel configuration is disposed on the outlet side of the anion exchange membrane, and the first channel configuration has a different geometry and/or layout from that of the second channel configuration,
wherein the carrier gas is $O_2$,
wherein the fluid is a compound that reacts with the carrier gas and the electrons to form the anion, and
wherein the electrochemical module is configured as an electrochemical compressor, and the transporting of (c) and the dissociating of (d) are such that the fluid at the outlet side is at a pressure higher than that of the fluid at the inlet side prior to the reacting of (b).

17. The method of claim 16, wherein:
the fluid is $CO_2$, and
the anion is $CO_3^{2-}$.

18. The method of claim 16, wherein:
the fluid is $H_2O$, and
the anion is $OH^-$.

19. The method of claim 16, wherein the catalyst of the first electrode or the catalyst of the second electrode comprises $CaRuO_3$.

* * * * *